United States Patent [19]
Kroh et al.

[11] Patent Number: 5,851,257
[45] Date of Patent: Dec. 22, 1998

[54] APPARATUS AND METHOD FOR PRESSING OF GLASS ARTICLES AT A HIGH CAVITY RATE

[75] Inventors: Herbert C. Kroh, LaSalle; David E. Crots, Ottawa Lake, both of Mich.

[73] Assignee: Libbey Glass Inc., Toledo

[21] Appl. No.: 670,973

[22] Filed: Jun. 26, 1996

[51] Int. Cl.$^6$ .................................................. C03B 11/16
[52] U.S. Cl. ............................... 65/320; 65/251; 65/356; 65/357; 65/359; 65/361; 65/362
[58] Field of Search .............................. 65/311, 319, 313, 65/356, 357, 359, 361, 362, 322, 320, 251

[56] References Cited

U.S. PATENT DOCUMENTS

| | | | |
|---|---|---|---|
| 1,864,689 | 6/1932 | Freese et al. | 65/260 |
| 3,149,951 | 9/1964 | Mennitt et al. | 65/235 |
| 3,268,322 | 8/1966 | Denman | 65/323 |
| 3,529,948 | 9/1970 | Eldred et al. | 65/159 |
| 3,867,123 | 2/1975 | Hamilton | 65/359 |
| 4,070,174 | 1/1978 | Nebelung et al. | 65/229 |
| 4,134,748 | 1/1979 | Hileman | 65/237 |
| 4,810,278 | 3/1989 | Braithwaite | 65/267 |
| 5,059,236 | 10/1991 | Ito | 65/319 |
| 5,215,566 | 6/1993 | Yamamoto et al. | 65/29.12 |
| 5,304,229 | 4/1994 | Swanfeld | 65/265 |
| 5,306,325 | 4/1994 | Smith et al. | 65/357 |

OTHER PUBLICATIONS

Catalog pages entitled "Lynch Barrel Cam Press", published by Lynch Machinery–Miller Hydro, Inc. of Bainbridge, Georgia, Undated.

Catalog pages entitled "Lynch Motor Driven Press", published by Lynch Machinery–Miller Hydro, Inc. of Bainbridge, Georgia, Undated.

*Primary Examiner*—Stanley S. Silverman
*Assistant Examiner*—Sean Vincent
*Attorney, Agent, or Firm*—Emch, Schaffer, Schaub & Porcello Co., L.P.A.

[57] ABSTRACT

The present invention is directed to an apparatus for pressing a glass article. The apparatus includes a frame. A mold having first and second mold halves are mounted on the frame. The mold halves define a cavity for receiving a glass gob. The mold halves are movable between open and closed positions. The apparatus includes a device for opening and closing the mold halves. A plunger is movably mounted on the frame adjacent the cavity. The plunger presses the glass gob into the cavity to form the glass article. The apparatus further includes a device for moving the plunger. An alternative embodiment of the invention is directed to a machine for pressing a plurality of glass articles at a high cavity rate. In this embodiment, the machine includes at least two apparatus as described above mounted on a device for moving the apparatus. The method of the present invention for using apparatus for pressing a plurality of glass articles at a high cavity rate includes the steps of: (a) rotating a carriage to which at least two apparatus as described above are attached; (b) actuating the device for opening and closing the mold to close the mold; (c) placing the glass gob adjacent the cavity; (d) actuating the device for moving the plunger to move the plunger to press the glass gob into the cavity to form the glass article; (e) withdrawing the plunger; (f) actuating the device for opening and closing the mold to open the mold a predetermined distance to cool the mold; and (g) actuating the device for opening and closing the mold to open the mold to remove the glass article from the cavity.

16 Claims, 23 Drawing Sheets

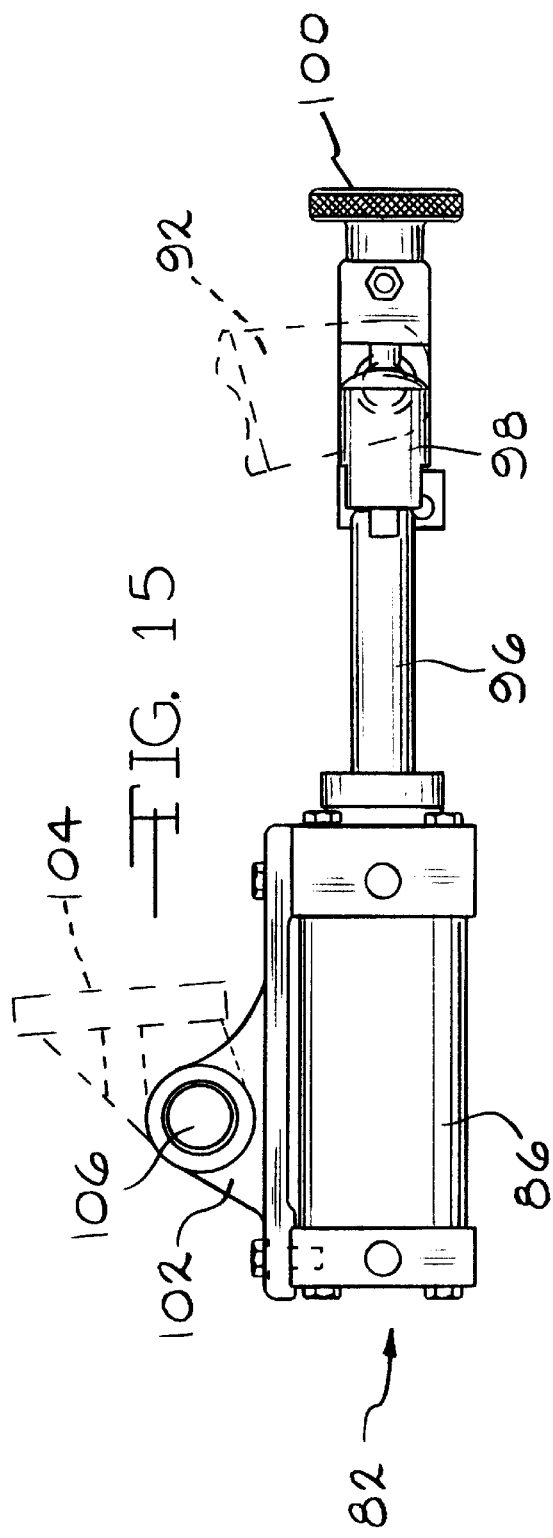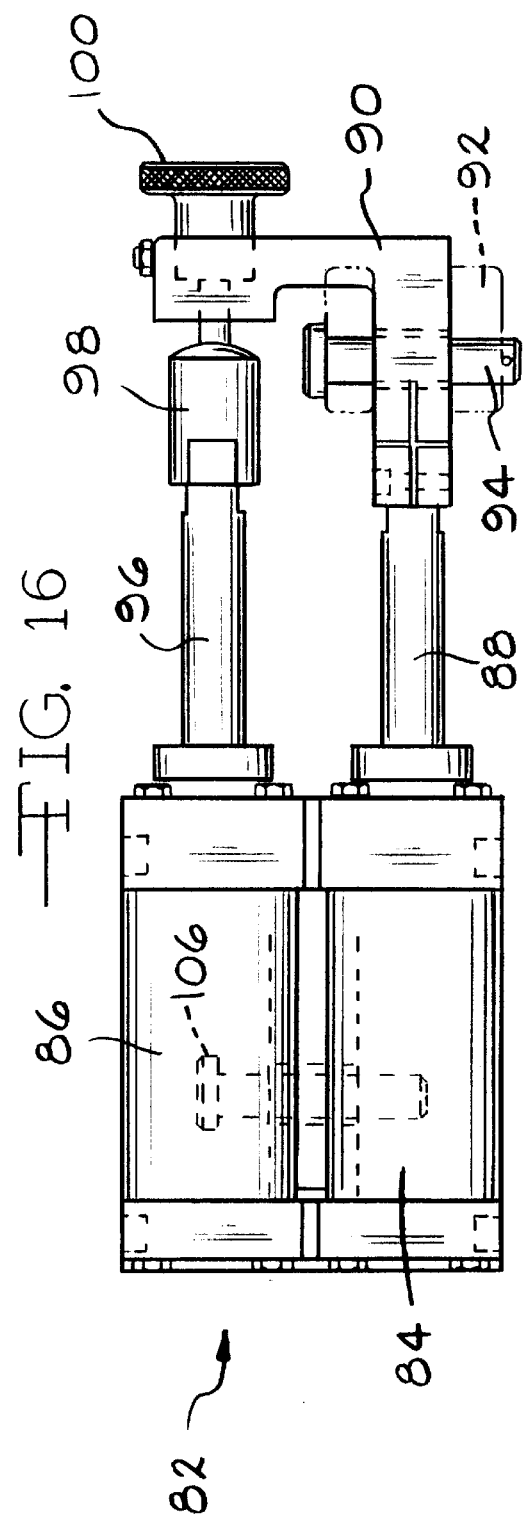

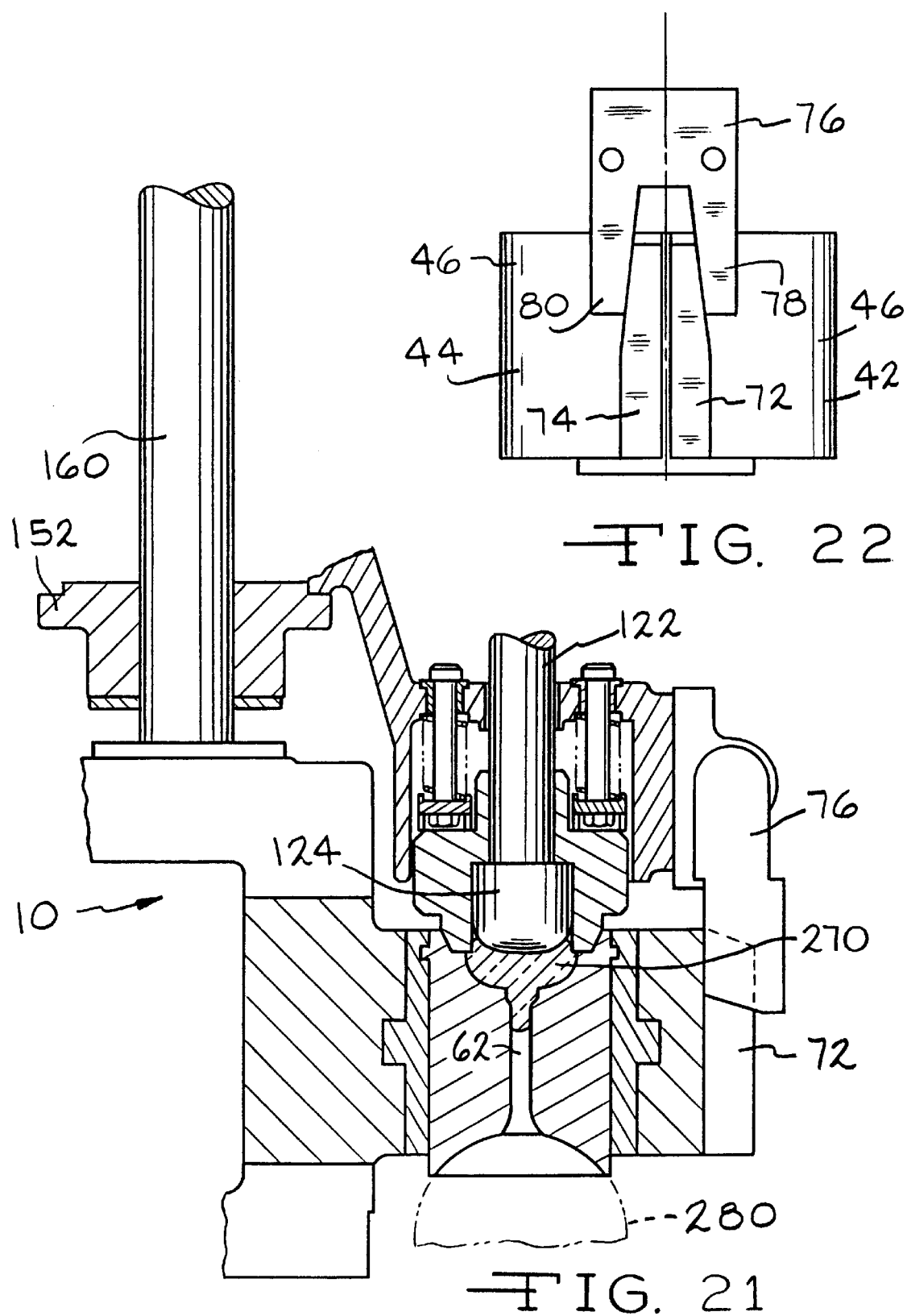

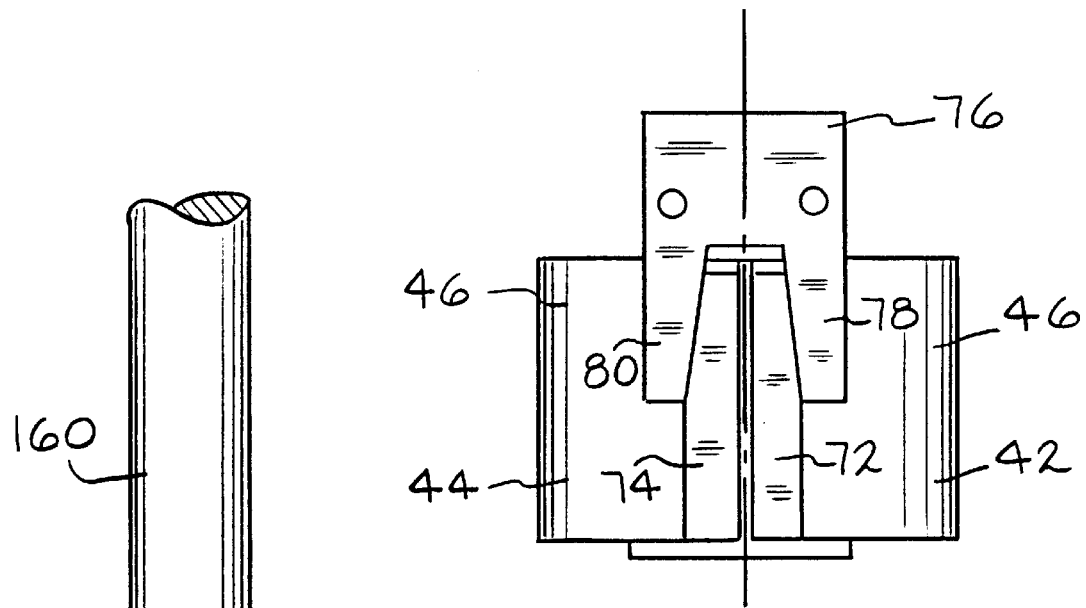
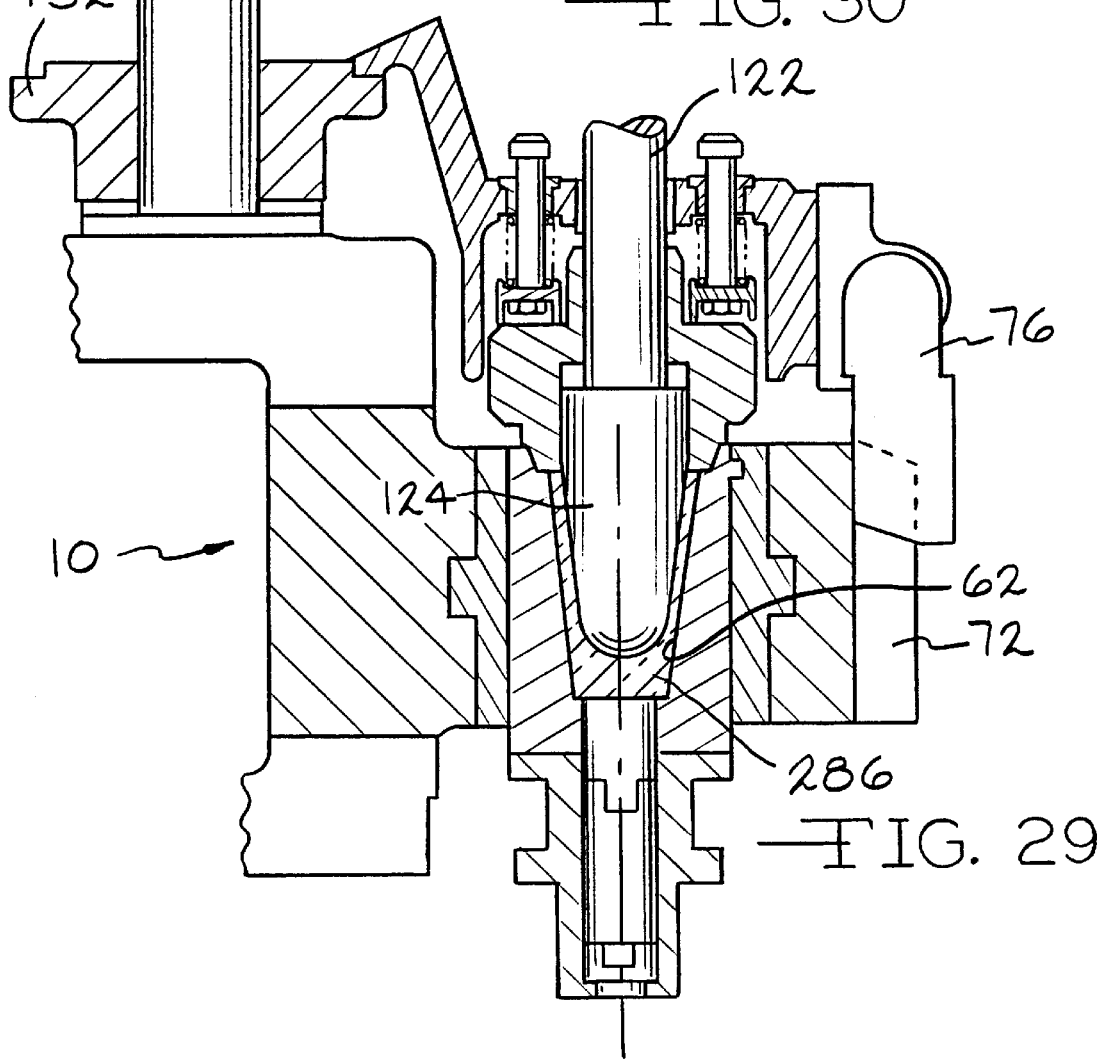

APPARATUS AND METHOD FOR PRESSING OF GLASS ARTICLES AT A HIGH CAVITY RATE

BACKGROUND OF THE INVENTION

The present invention relates to an apparatus and a method for using such apparatus for the pressing of glass articles at a high cavity rate. More specifically, the invention is directed to an apparatus having, among other things, a mold and a plunger in which a glass gob is pressed into the mold by the plunger to form a glass article. The method of the present invention relates to the pressing of a glass article using the apparatus of the invention.

Glassware pressing machines are known in the art. An example of such a machine is an indexing press machine. This type of machine includes an indexing table that rotates on a central axis. A plurality of molds are mounted on the indexing table. A single plunger is fixedly mounted above the indexing table in alignment with the molds. The indexing table positions the molds under the plunger so that glass gobs can be pressed into the molds by the plunger. The plunger is then withdrawn from the mold. The indexing table rotates the next mold to a position under the plunger. After a glass article has been pressed in a mold, the mold is opened and the article is removed.

The prior art indexing press machines are slow and inefficient. It has been found that an indexing press machine can move only as fast as the plunger can move in and out of the molds. The governing feature of the machine therefore is plunger contact time. This results in a low piece per minute output of glass articles. The most efficient indexing press machines can only produce approximately 50 glass articles per minute.

In view of the inefficiencies of the prior art machines, it has been found that there is a need for an apparatus and a method for using such apparatus that allows for the pressing of glass articles at a high cavity rate. This machine should allow for a high piece per minute output with the lowest optimal number of molds. The present invention satisfies this need.

SUMMARY OF THE INVENTION

The present invention is directed to an apparatus for pressing a glass article. The apparatus includes a frame. A mold having first and second mold halves is mounted on the frame. The mold halves define a cavity for receiving a glass gob. The mold halves are movable between open and closed positions. The apparatus includes a device for opening and closing the mold halves. A plunger is movably mounted on the frame adjacent the cavity. The plunger presses the glass gob into the cavity to form the glass article. The apparatus further includes a device for moving the plunger.

An alternative embodiment of the invention is directed to a machine for pressing a plurality of glass articles at a high cavity rate. In this embodiment, the machine includes at least two apparatus for pressing glass articles mounted on a device for moving the apparatus. Each of the apparatus includes a frame. Molds having first and second mold halves are mounted on the frames. The mold halves define cavities for receiving glass gobs. The mold halves are movable between open and closed positions. The apparatus includes devices for opening and closing the mold halves. Plungers are movably mounted on the frames adjacent the cavities. The plungers press the glass gobs into the cavities to form glass articles. The apparatus further include devices for moving the plungers.

The present method for using the apparatus for pressing a plurality of glass articles at a high cavity rate includes the steps of:

(a) rotating a carriage to which at least two apparatus for pressing glass articles are attached, each of the apparatus including a frame, a mold having first and second mold halves mounted on the frame, the mold halves defining a cavity for receiving a glass gob, the mold halves being movable between open and closed positions, a device for opening and closing the mold halves, a plunger movably mounted on the frame adjacent the cavity, and a device for moving the plunger;

(b) actuating the device for opening and closing the mold to close the mold;

(c) placing the glass gob adjacent the cavity;

(d) actuating the device for moving the plunger to move the plunger to press the glass gob into the cavity to form the glass article;

(e) withdrawing the plunger;

(f) actuating the device for opening and closing the mold to open the mold a predetermined distance to cool the mold; and (g) actuating the device for opening and closing the mold to open the mold to remove the glass article from the cavity.

It is the primary object of the present invention to provide an apparatus and a method for the pressing of glass articles at a high cavity rate.

Other objects and advantages of the present invention will become apparent to those skilled in the art upon a review of the following detailed description of the preferred embodiments and the accompanying drawings.

BRIEF DESCRIPTION OF THE DRAWINGS

FIG. 15 is a top view of the mold operating cylinder assembly according to the present invention;

FIG. 16 is a side elevational view of the cylinder assembly;

FIG. 21 is a schematic view similar to the view of FIG. 17 in which the plunger has moved farther into cavity;

FIG. 22 is a view similar to the view of FIG. 18 showing the relationship between the mold halves and the mold grip assembly when the apparatus is in the position shown in FIG. 21;

FIG. 29 is a schematic view similar to the view of FIG. 25 showing the plunger fully extended into the cavity of the mold;

FIG. 30 is a schematic view similar to the view of FIG. 26 showing the relationship between the mold halves and the mold grip assembly when the apparatus is in the position shown in FIG. 29.

DETAILED DESCRIPTION OF THE PREFERRED EMBODIMENTS

Figure 1:
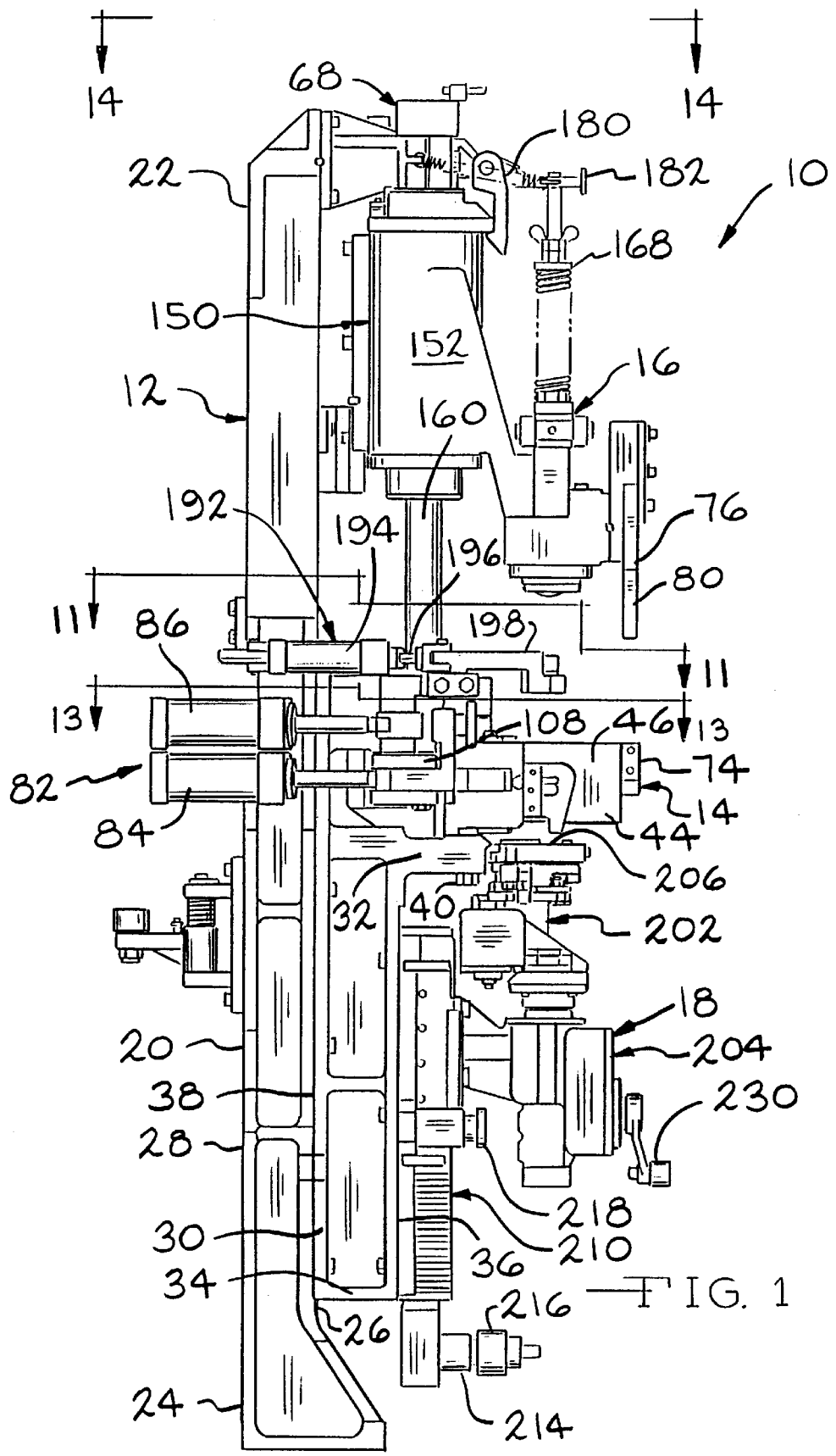
FIG. 1 is a side elevational view of the apparatus according to the present invention.
Figure 2:
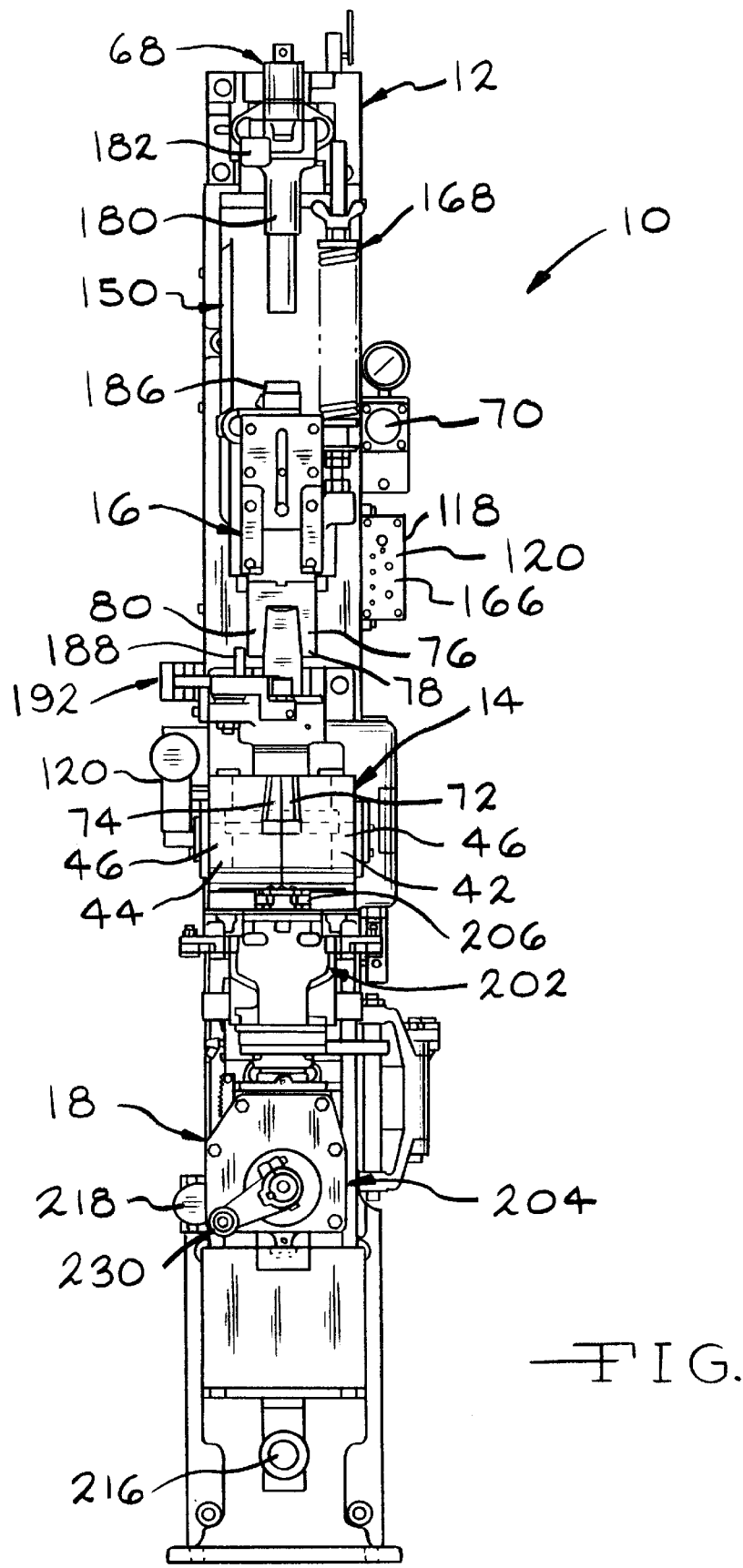
FIG. 2 is a front elevational view of the apparatus.
Figure 3:
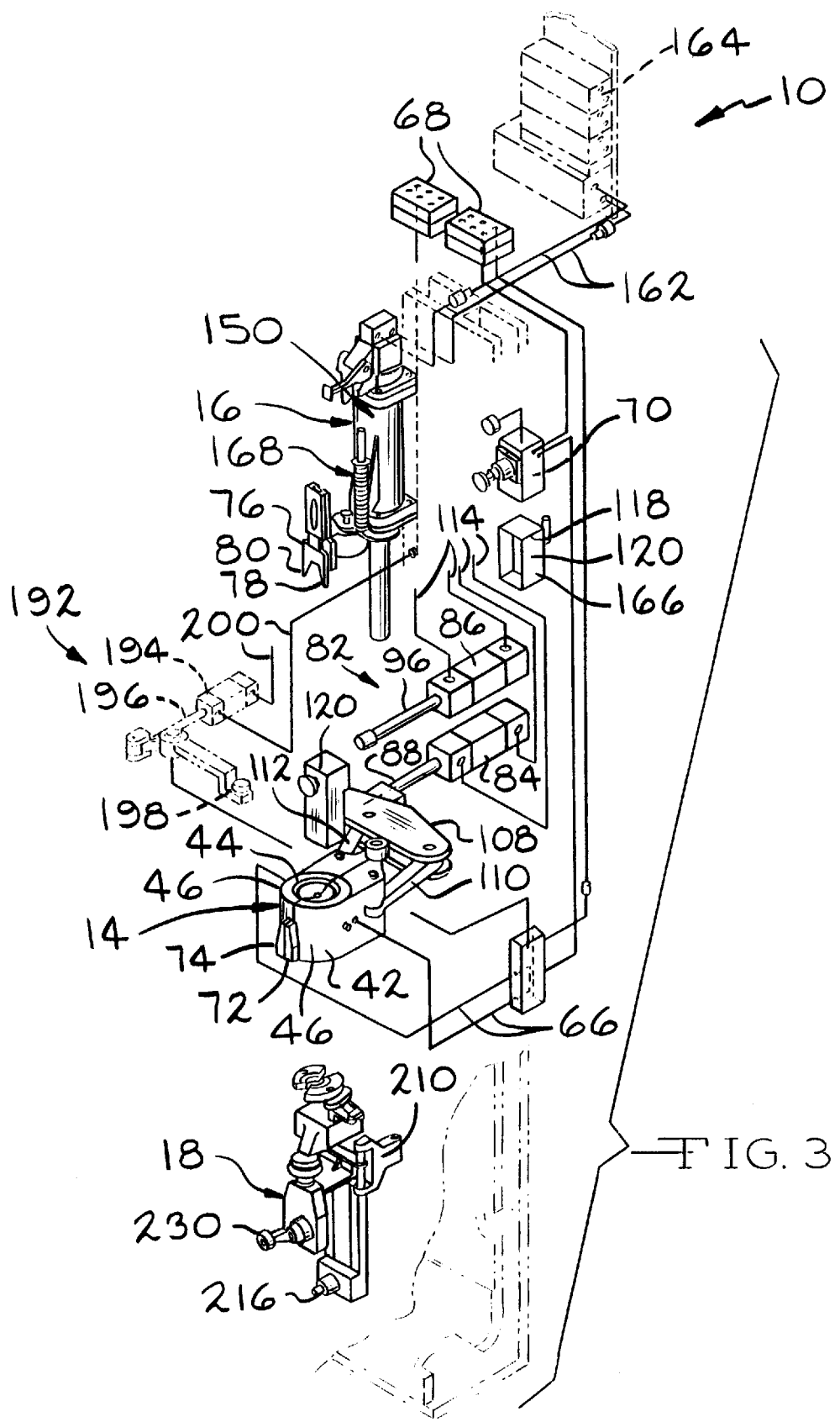
FIG. 3 is an exploded view of the plunger, mold, ware elevator and control assemblies of the apparatus of the present invention.
Figure 5:
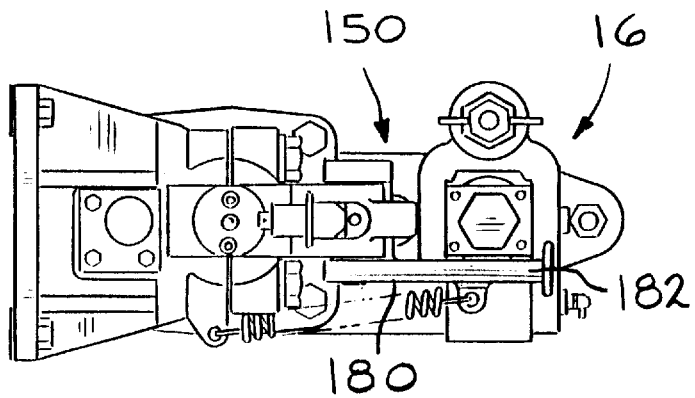
FIG. 5 is a top view of the plunger assembly.

The preferred embodiments and best mode of the present invention will now be described in detail with reference being made to the drawings. The apparatus for pressing a glass article according to the present invention is indicated generally in the drawings by the reference number "10". Referring to FIGS. 1–3, the apparatus 10 generally includes a frame 12, a mold 14 and a plunger assembly 16. Depending on the application, the apparatus 10 can include a ware elevator assembly 18.

Referring to FIG. 1, the frame 12 of the apparatus 10 includes a vertically extending section frame 20 having a top 22 and a bottom 24. The section frame 20 further includes a front 26 and a back 28. As shown in the FIG. 1, a mold hinge frame 30 is fixedly mounted on the front 26. The mold hinge frame 30 includes a top 32, a bottom 34, a front 36 and a back 38.

Figure 12:
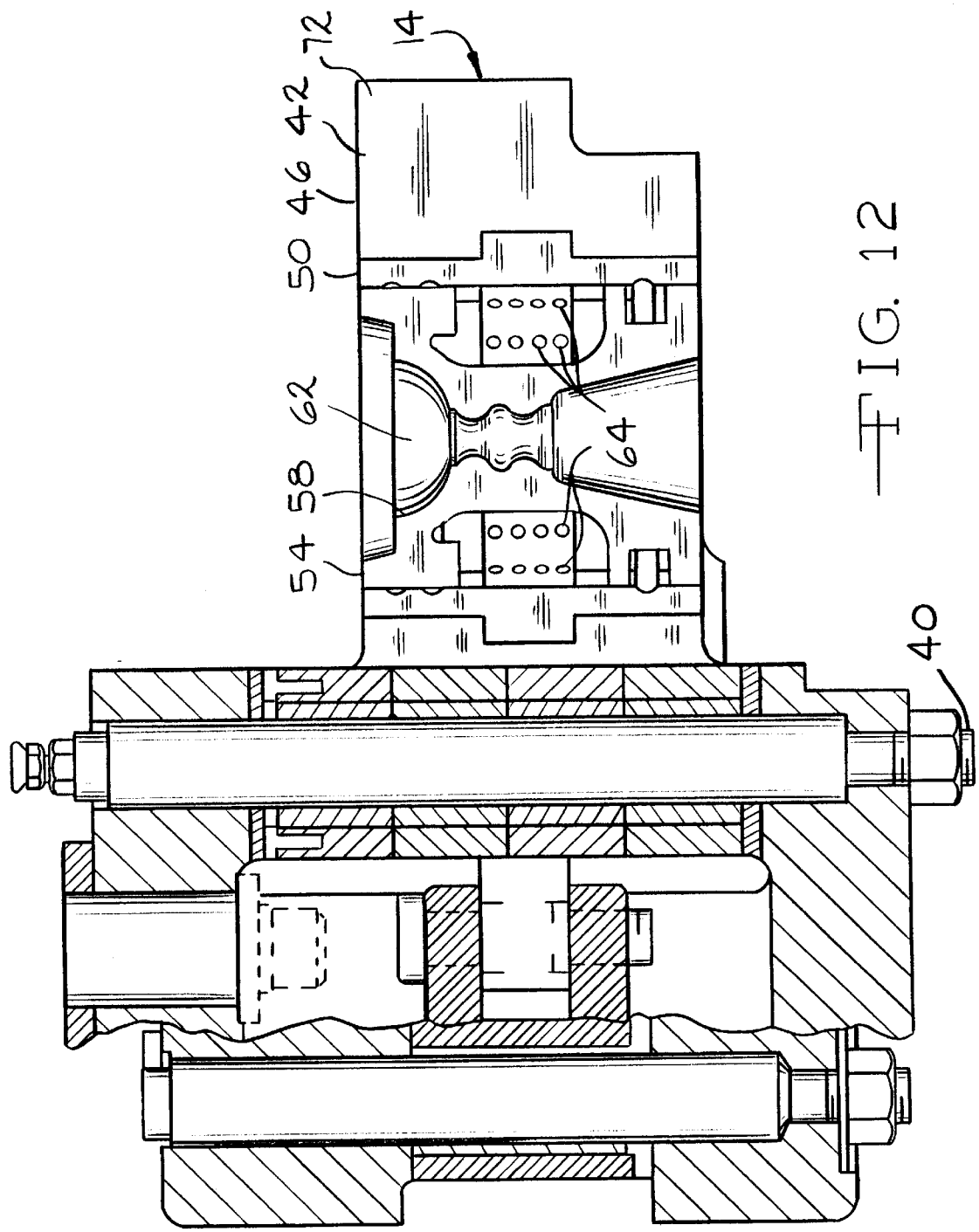
FIG. 12 is a cross sectional view taken through line 12—12 of FIG. 11.

Referring to FIGS. 1–3 and 11–13, the mold 14 is movably mounted by a hinge bolt 40 on the top 32 of the mold hinge frame 30. The mold 14 has a first mold half 42 and an identical second mold half 44. As shown in FIG. 1 2, each of the first and second mold halves 42 and 44 includes an exterior wall 46, an interior wall 50 and a cavity wall 54. In each mold half, the exterior wall 46 is spaced from the interior wall 50, and the interior wall 50 is spaced from the cavity wall 54. As shown in FIG. 12, the cavity wall 54 includes an interior surface 58. The interior surfaces of the mold halves define a cavity 62 for receiving a glass gob. The cavity 62 can be a variety of forms or shapes depending on the application, including the stem form shown in FIGS. 12 and 17, and the drinking glass form shown in FIG. 25.

Still referring to FIG. 12, the interior walls 50 include a plurality of passageways 64 that allow for the movement of air between the spaces defined by the exterior walls 46, the interior walls 50 and the cavity walls 54. As shown in FIG. 3, the exterior walls 46 are connected to air lines 66 that are in communication with a supply of air through connecting manifolds 68. The flow of air to lines 66 is regulated by a mold cooling regulator 70. The cooling air moves past the interior walls 50 through the plurality of passageways 64. The cooling air moves freely in the spaces defined by the exterior walls 46, the interior walls 50 and the cavity walls 54 of the first and second mold halves 42 and 44. The cooling air maintains the mold 14 at a predetermined temperature.

Referring to FIGS. 1, 2, 13, 18 and 20, the exterior walls 46 of the first and second mold halves 42 and 44 include outwardly projecting first and second mold holders 72 and 74, respectively. The first and second mold holders 72 and 74 are received by a mold grip assembly 76 that is mounted on the plunger assembly 16. The mold grip assembly 76 includes a first time 78 and a second time 80. The first and second times 78 and 80 are in spaced relationship. The first and second mold holders 72 and 74 are received in the space defined by the first and second times 78 and 80. The engagement of the mold grip assembly 78 with the first and second mold holders 72 and 74 causes the first and second mold halves 42 and 44 to be drawn and held together during the pressing cycle of the apparatus 10.

Referring to FIGS. 1–3, 13, 15, 16 and 31, the first and second mold halves 42 and 44 of the mold 14 are movable between open and closed positions and numerous positions therebetween. It is important that the first and second mold halves 42 and 44 can be fully opened to remove the pressed glass article formed in the cavity 62 and fully closed to press a glassware article in the cavity 62. It is also important that the first and second mold halves 42 and 44 can be slightly separated or "cracked" in order to cool the mold 14 after the press cycle. The first and second mold halves 42 and 44 are moved between open and closed positions by a mold operating cylinder assembly indicated generally in the drawings by reference number "82". As shown in FIGS. 15 and 16, the cylinder assembly 82 includes a mold operating cylinder 84 and mold cracking cylinder 86. The mold operating cylinder 84 includes an operating cylinder reciprocating arm 88 in communication with a cylinder rod eye 90. The cylinder rod eye 90 is pivotally attached to a mold operating arm 92 by a mold clevis pin 94. The mold cracking cylinder 86 includes a mold cracking cylinder reciprocating arm 96 having a cracking cylinder rod end 98. The rod end 98 is in communication with a mold opening knob assembly 100 that is rotatably mounted on the cylinder rod eye 90. As shown in FIG. 15, the mold operating cylinder assembly 82 includes a cylinder mounting bracket 102 that is pivotally attached to a mold cylinder pivot bracket 104 of the apparatus 10 by a mold cylinder pivot pin 106.

Figure 13:
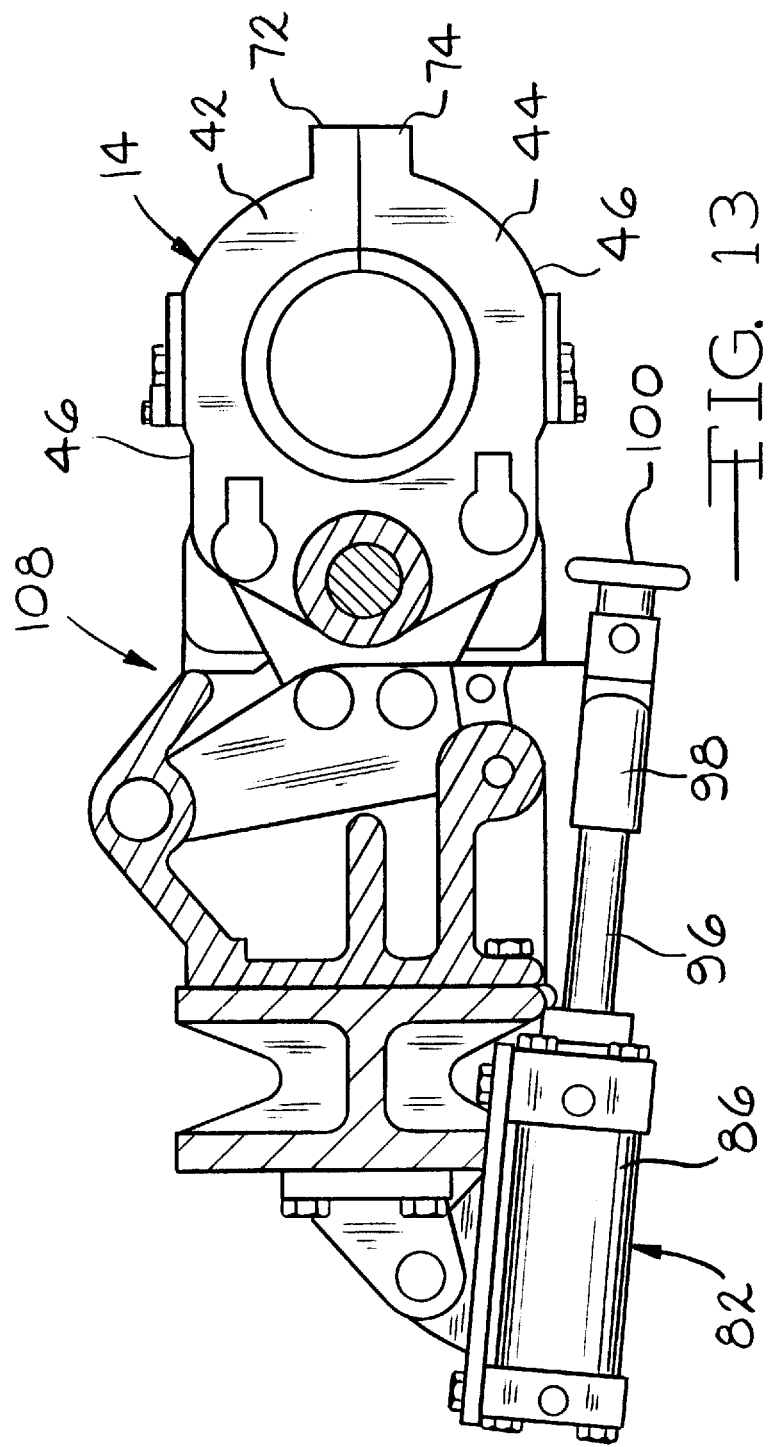
FIG. 13 is a cross sectional view taken through line 13—13 of FIG. 1.
Figure 14:
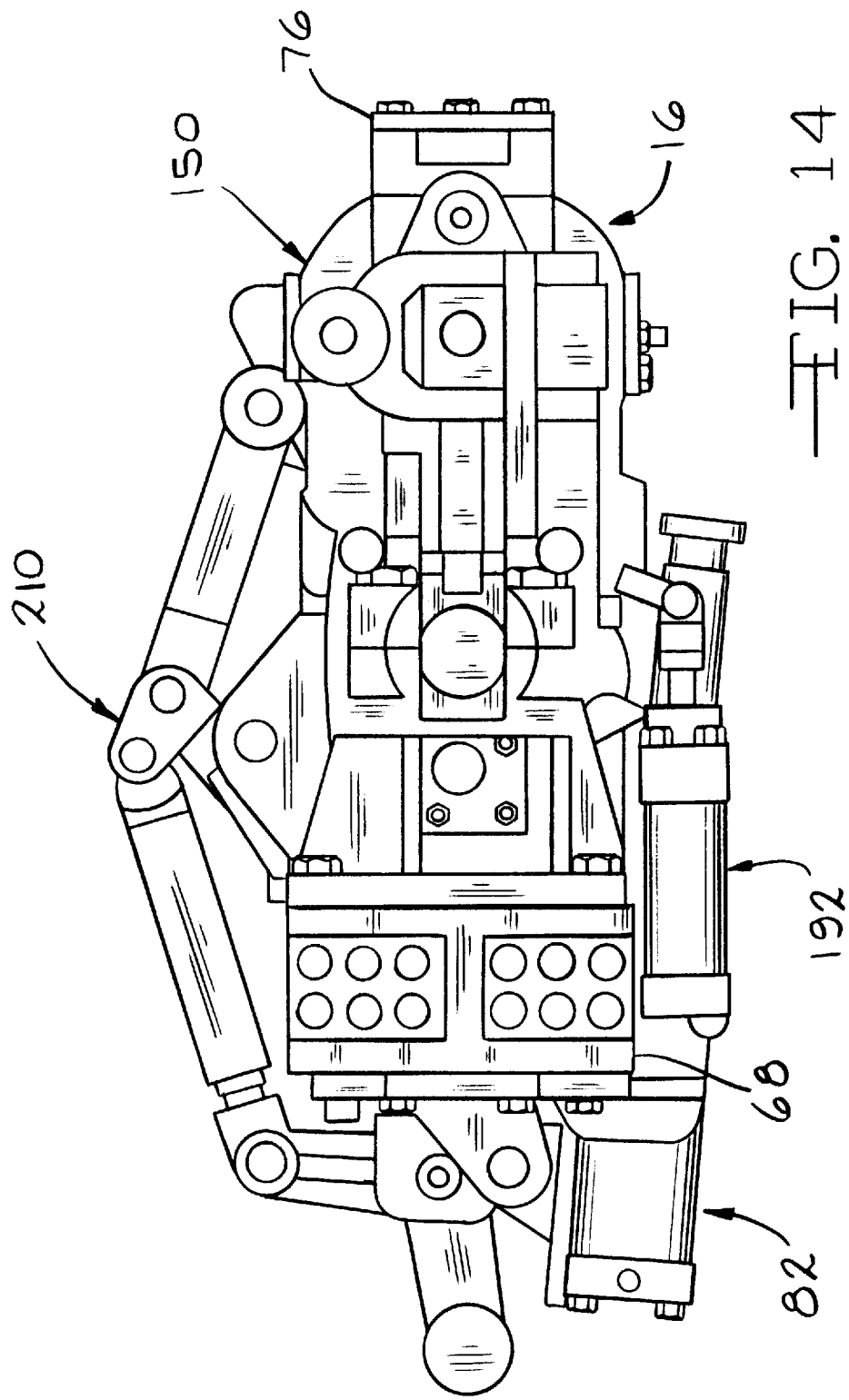
FIG. 14 is a plan view taken along line 14—14 of FIG. 1.

Referring to FIGS. 1, 3 and 13, the mold operating cylinder assembly 82 is in communication with the mold 14 by a linkage assembly 108. As shown in FIG. 3, the linkage assembly 108 includes a first linkage arm 110 in communication with the first mold half 42 and a second linkage 112 in communication with the second mold half 44. The mold operating cylinder 84 and the mold cracking cylinder 86 are in communication with a supply of air through a plurality of air lines 114 that are connected to the connecting manifolds 68. Actuation of the mold operating cylinder 84 and the mold cracking cylinder 86 causes reciprocation of the operating cylinder reciprocating arm 88 and the mold cracking cylinder reciprocating arm 96, respectively. This causes the linkage assembly 108 to open, close, or crack the first and second mold halves 42 and 44 accordingly. The opening and closing of the first and second mold halves 42 and 44 can be regulated by a mold opening control 118. The cracking of the first and second mold halves 42 and 44 can be regulated by a mold cracking control 120.

Figure 6:
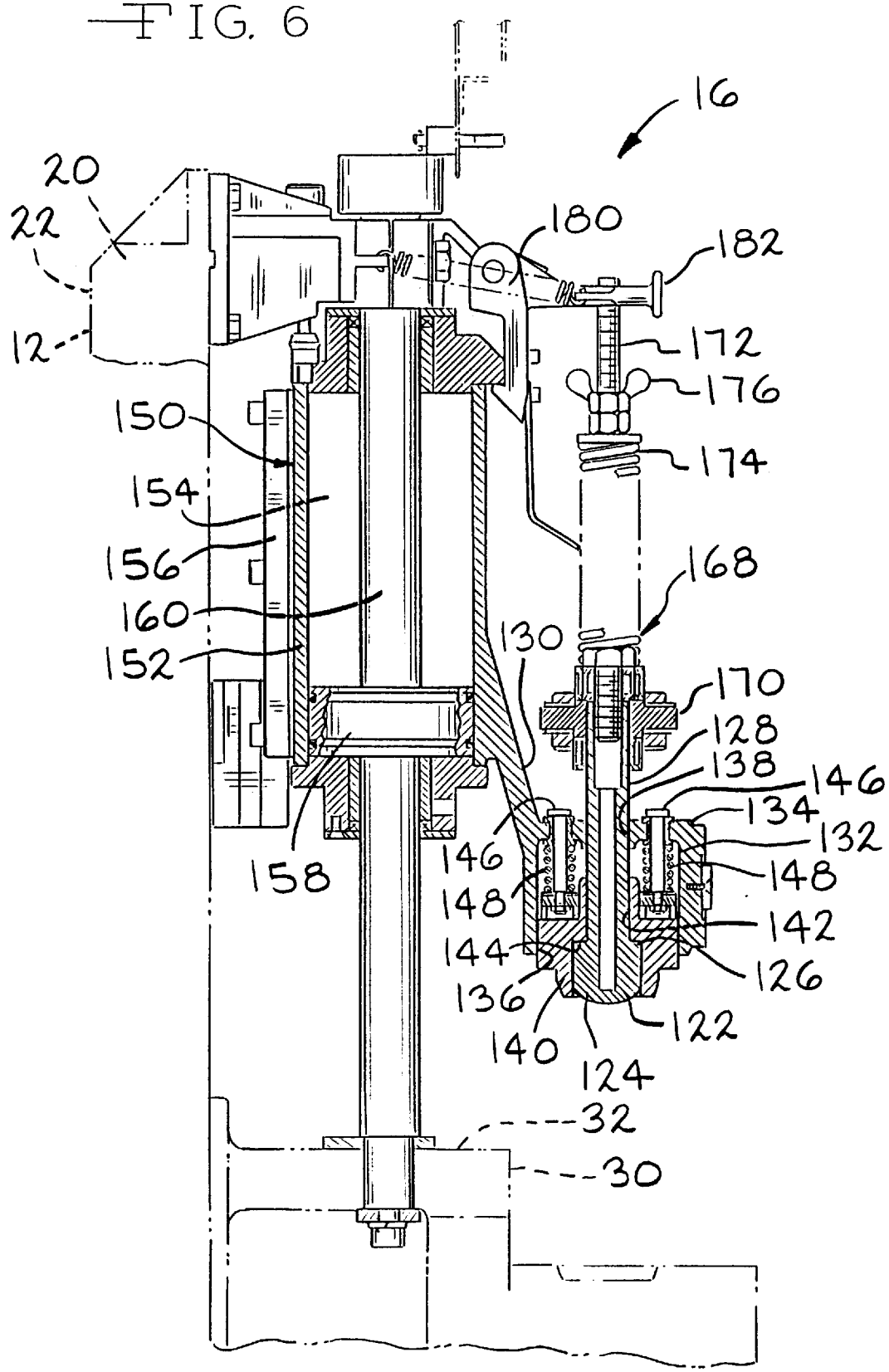
FIG. 6 is a cross sectional view of the plunger assembly.

Referring to FIG. 1–6 and 14, the plunger assembly 16 of the apparatus 10 is shown in detail. Referring to FIG. 6, the plunger assembly 16 includes a plunger 122 having a head 124, a shoulder 126 and a hollow body 128. The plunger 122 is movably mounted on a plunger arm 130. The plunger arm 130 defines a plunger cavity 132 having a top wall 134 and an opposed open end 136. The top wall 134 defines an opening 138 for receiving the body 126 of the plunger 122. The open end 136 of the plunger cavity 132 receives a plunger ring 140 that defines a plunger bore 142 that receives the plunger 122. The plunger ring 140 further defines a plunger ring shoulder 144 that engages the shoulder 126 of the plunger 122. Positioned between the plunger ring 140 and the top wall 134 of the plunger cavity 132 are shoulder screws 146 each having springs 148. The springs 148 maintain the plunger ring 140 and thus the plunger 122 within the plunger cavity 132.

Still referring to FIG. 6, the plunger arm 130 is fixedly attached to a press cylinder head assembly 150. The head assembly 150 includes a cylindrical housing 152 that defines a cylinder cavity 154. The housing 152 is movably mounted adjacent the top 22 of the section frame 20 by a press cylinder guide 156. The head assembly 150 includes a piston 158 and a piston rod 160. The piston rod 160 extends from the housing 152 and is fixedly attached to the top 32 of the mold hinge frame 30. As shown schematically in FIG. 3, the head assembly 150 is in communication with a supply of air through air lines 162 that are in communication with a control valve assembly 164. Movement of air through the cylinder cavity 154 causes the press cylinder head assembly 150 to move along the path defined by the piston rod 160. This causes corresponding movement of the plunger arm 130 and thus the plunger 122. Referring to FIGS. 2 and 3, movement of air to the cylinder cavity 154 can be regulated by a press head control 166.

Figure 4:
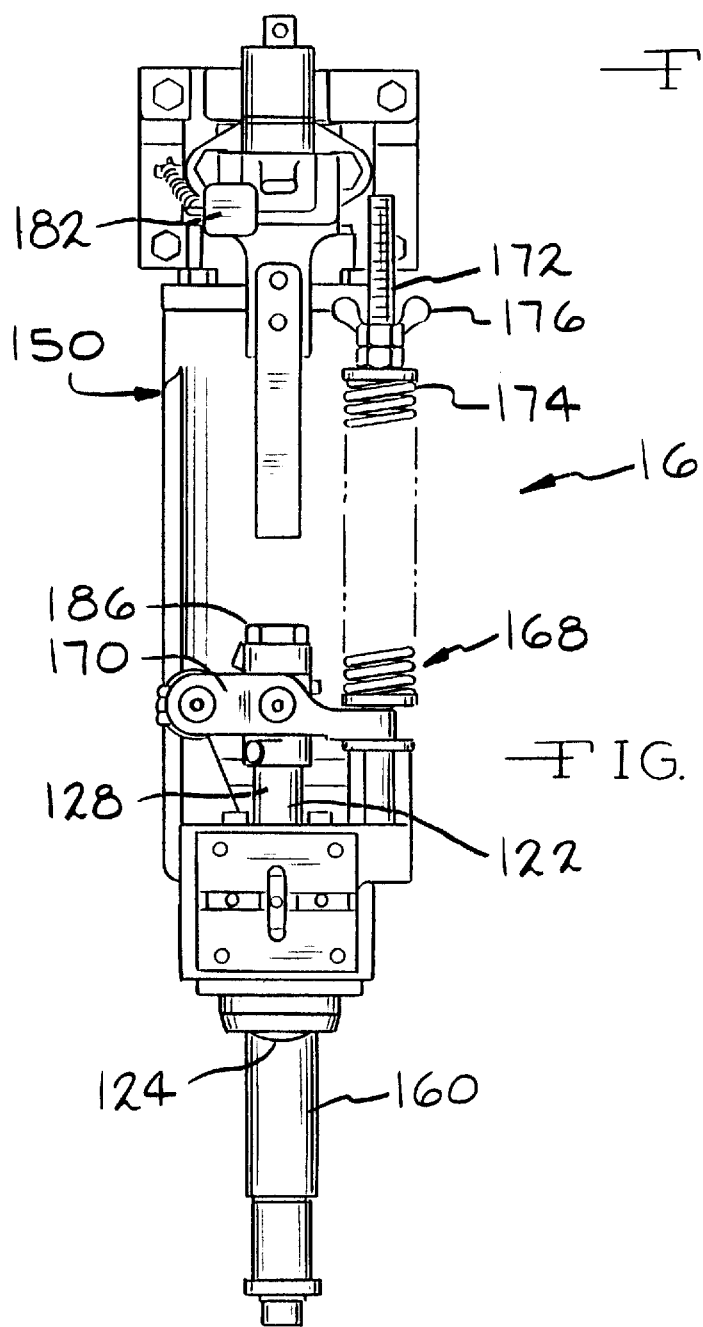
FIG. 4 is a front elevational view of the plunger assembly according to the present invention.

Referring to FIGS. 4 and 6, the plunger assembly 16 further includes a spring press cylinder assembly 168 for adjusting the stroke of the plunger 122. As shown in FIG. 4, the body 128 of the plunger 122 is pivotally attached to an adjustment arm 170. The adjustment arm is in communication with an adjustment rod 172. An adjustment spring 174 having a wing nut 176 is mounted on the adjustment rod 172. Rotation of the wing nut 176 causes compression or decompression of the adjustment spring 174 thereby causing movement of the adjustment arm 170 and thus the plunger 122.

The apparatus 10 includes a number of lock-out features. Referring to FIGS. 1, 2, 4 and 5, the apparatus 10 includes a press head latch 180. The press head latch 180 is in communication with a latch pin 182. As shown in FIG. 1, the press head latch 180 is pivotally mounted to engage and disengage the housing 152 of the press cylinder head assembly 150 to restrain the movement of the plunger assembly 16. As shown in FIG. 2, the apparatus 10 further includes a plunger locking bolt 186 that can be turned to restrict the movement of the plunger 122. Still referring to FIG. 2, the apparatus 10 further includes a mold lock-out pin 188 that restricts the movement of the first and second mold halves 42 and 44.

Referring now to FIGS. 1–3 and 11, the apparatus 10 includes a plunger burner cylinder assembly 192. The assembly 192 includes a heater cylinder 194 having a heater cylinder reciprocating arm 196 in communication with a heater arm 198. The heater cylinder 194 is in communication with a supply of air through air lines 200 that are in communication with the connecting manifolds 68. Actuation of the heater cylinder 194 results in the reciprocation of the heater cylinder reciprocating arm 196 and thus movement of the heater arm 198. The heater arm 198 can engage the plunger 122 to heat the plunger to a predetermined temperature depending on the application. It has been found that in most applications, the plunger 122 does not require heating by the heater arm 198.

Figure 7:
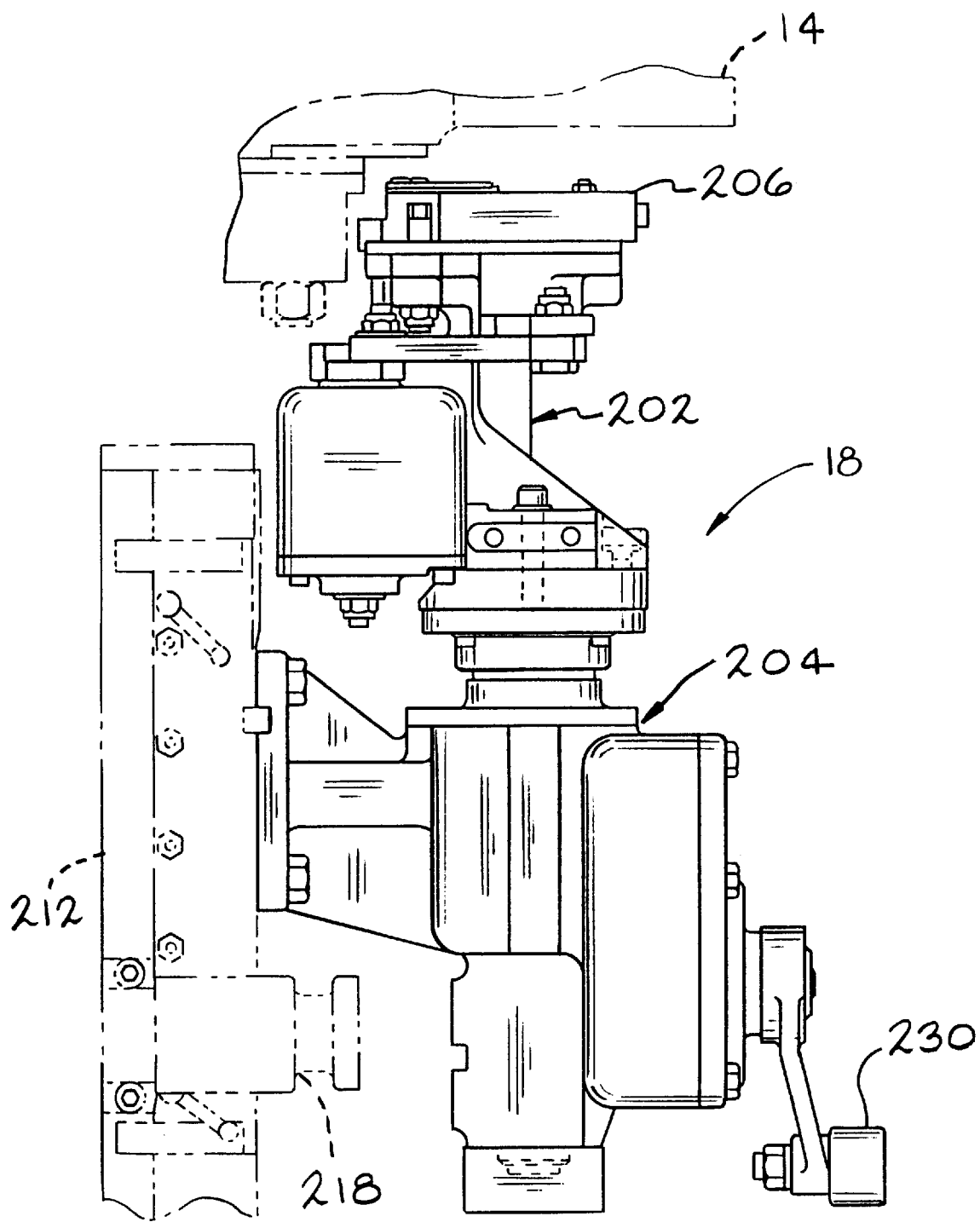
FIG. 7 is a side elevational view of the ware elevator assembly according to the present invention.
Figure 8:
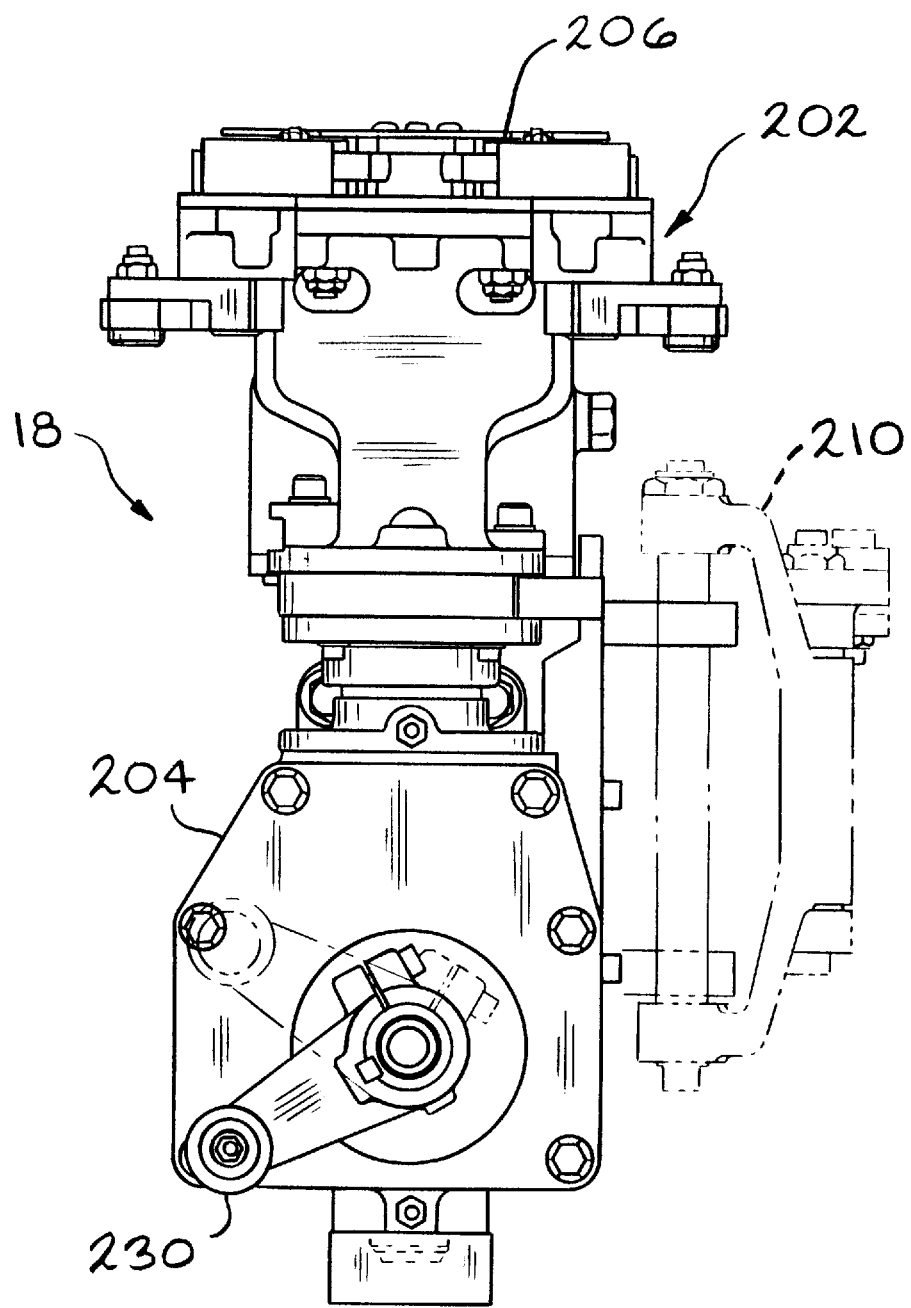
FIG. 8 is a front elevational view of the ware elevator assembly.

Referring to FIGS. 1–3 and 7–10, the ware elevator assembly 18 of the present invention is shown in detail. Referring to FIGS. 7 and 8, the ware elevator assembly 18 includes a ware holder assembly 202 and an elevator box assembly 204. The ware holder assembly 202 includes a ware platform 206 that is adapted to receive a glass item such as a bowl of a piece of stemware. As described below, the ware platform 206 supports a glass item adjacent the cavity 62 of the first and second mold halves 42 and 44 of the mold 14 so that the glass item can be joined to the glass article being pressed in the cavity. The ware holder assembly 202 is mounted on the elevator box assembly 204. The elevator box assembly 204 is attached to a ware holder operating assembly 210.

Figure 9:
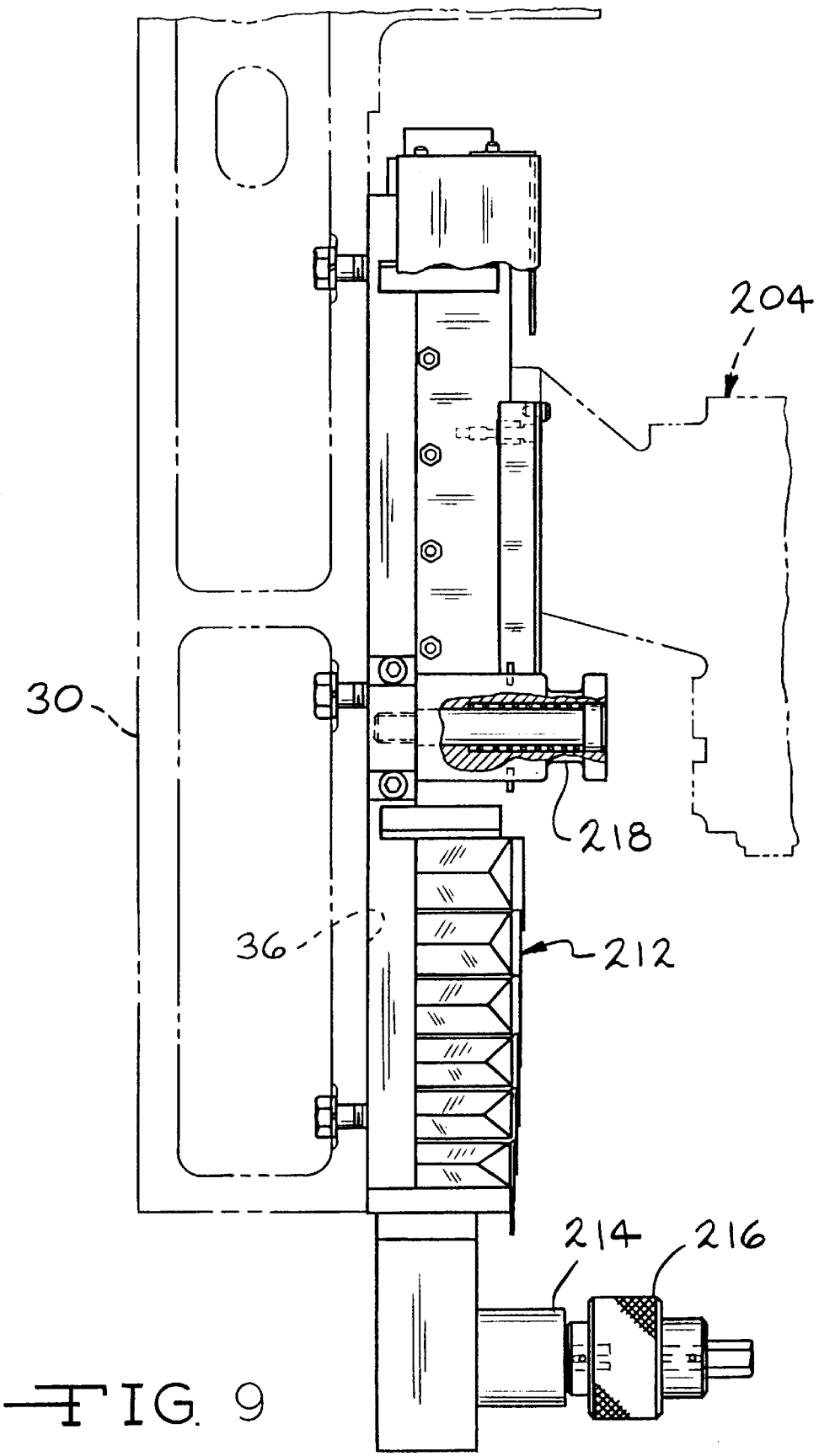
FIG. 9 is a side elevational view of the slide assembly according to the present invention.
Figure 10:
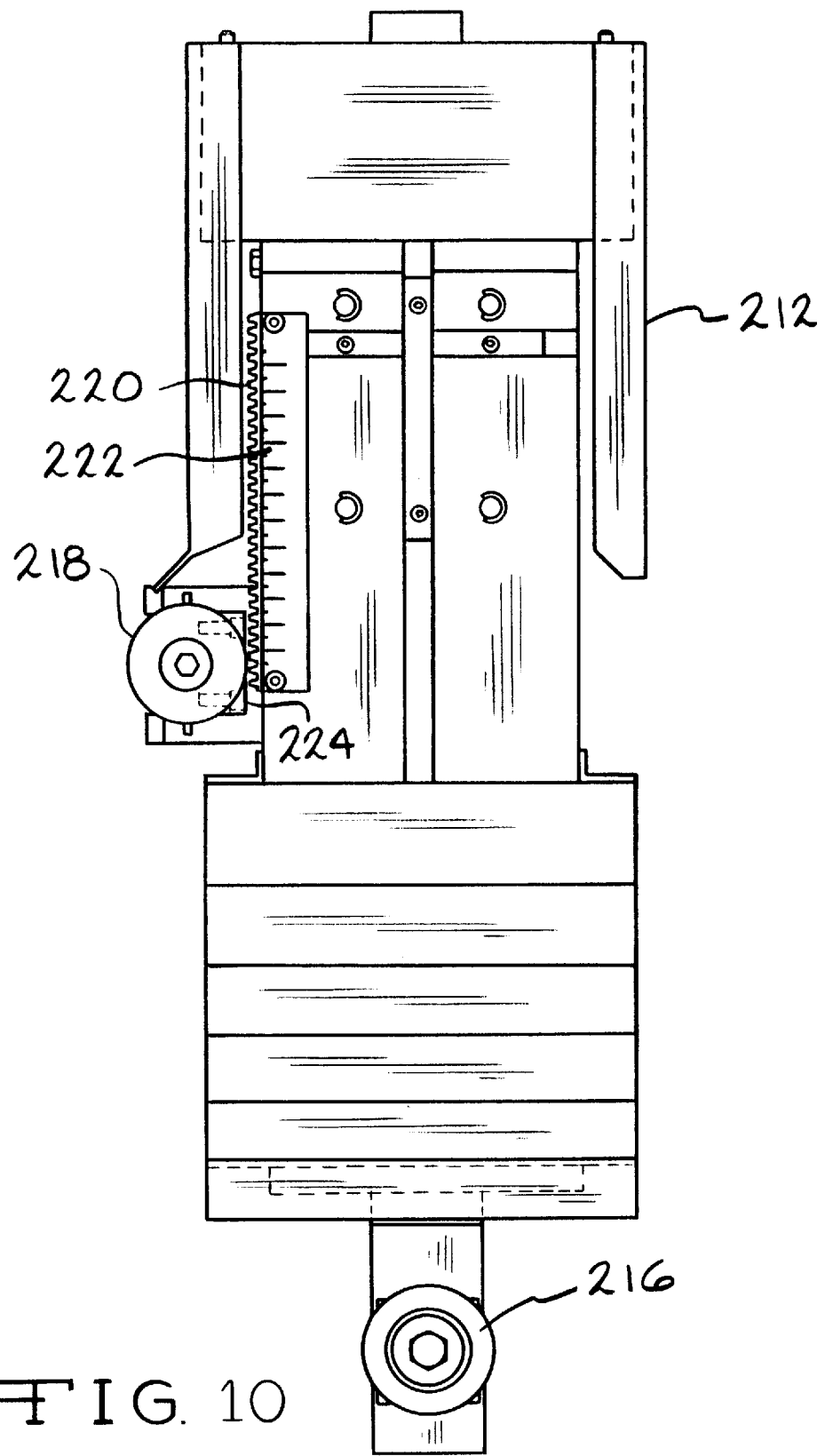
FIG. 10 is a front elevational view of the slide assembly.
Figure 11:
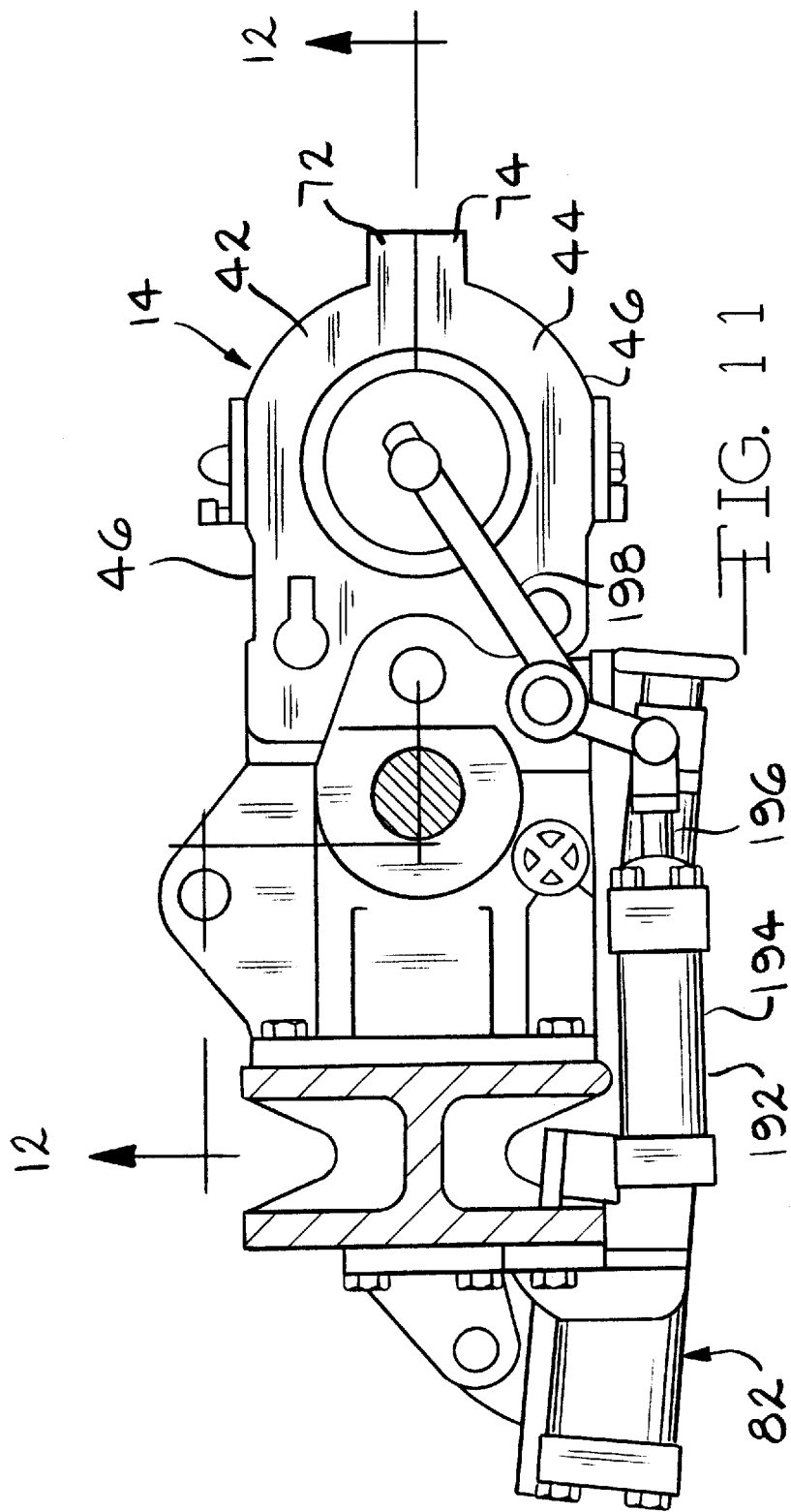
FIG. 11 is a cross sectional view taken through line 11—11 of FIG. 1.

Referring to FIGS. 7, 9 and 10, the elevator box assembly 204 is in communication with a slide assembly 212 that is mounted on the front 36 of the mold hinge frame 30. The slide assembly 212 regulates the vertical movement of the elevator box assembly 204 and thus the movement of the ware platform 206. The slide assembly 212 includes a torque limiter 214 having an adjustment knob 216. The slide assembly 212 further includes an elevator position and lock assembly 218. As shown in FIG. 10, the slide assembly 212 includes a rack 220 having an indicator plate 222. The rack 220 engages a short rack 224 that is part of the elevator position and lock assembly 218. Adjustments made to the slide assembly 212 are visually indicated on the plate 222.

Referring to FIGS. 7 and 8, the elevator box assembly 204 of the ware elevator assembly 18 includes a cam follower 230. The cam follower 230 engages a cam (not shown) positioned on, for example, a pressing machine as described below. When the cam follower 230 engages the cam, the ware elevator assembly 18 is moved upwardly to a position adjacent the mold 14. The cam follower 230 follows the cam to a point were the ware elevator assembly 18 is moved downwardly in relation to the mold 14.

The apparatus 10 of the present invention can be used either alone or in combination with other like apparatus. As shown schematically in FIG. 31, at least two apparatus 10, as represented by the molds 14, can be used in combination. In a preferred embodiment, twenty-four apparatus 10 are movably mounted on a rotatable carriage 250 to form a machine 252 for pressing a plurality of glass articles at a high cavity rate. The carriage 250 moves in the direction indicated the arrow 254. The machine 252 is positioned adjacent, for example, a nine-head bowl loader machine 256 that moves in the direction indicated by the arrow 258 and a fifteen-head glassware article unloader machine 260 that moves in the direction indicated by the arrow 262.

Figure 17:
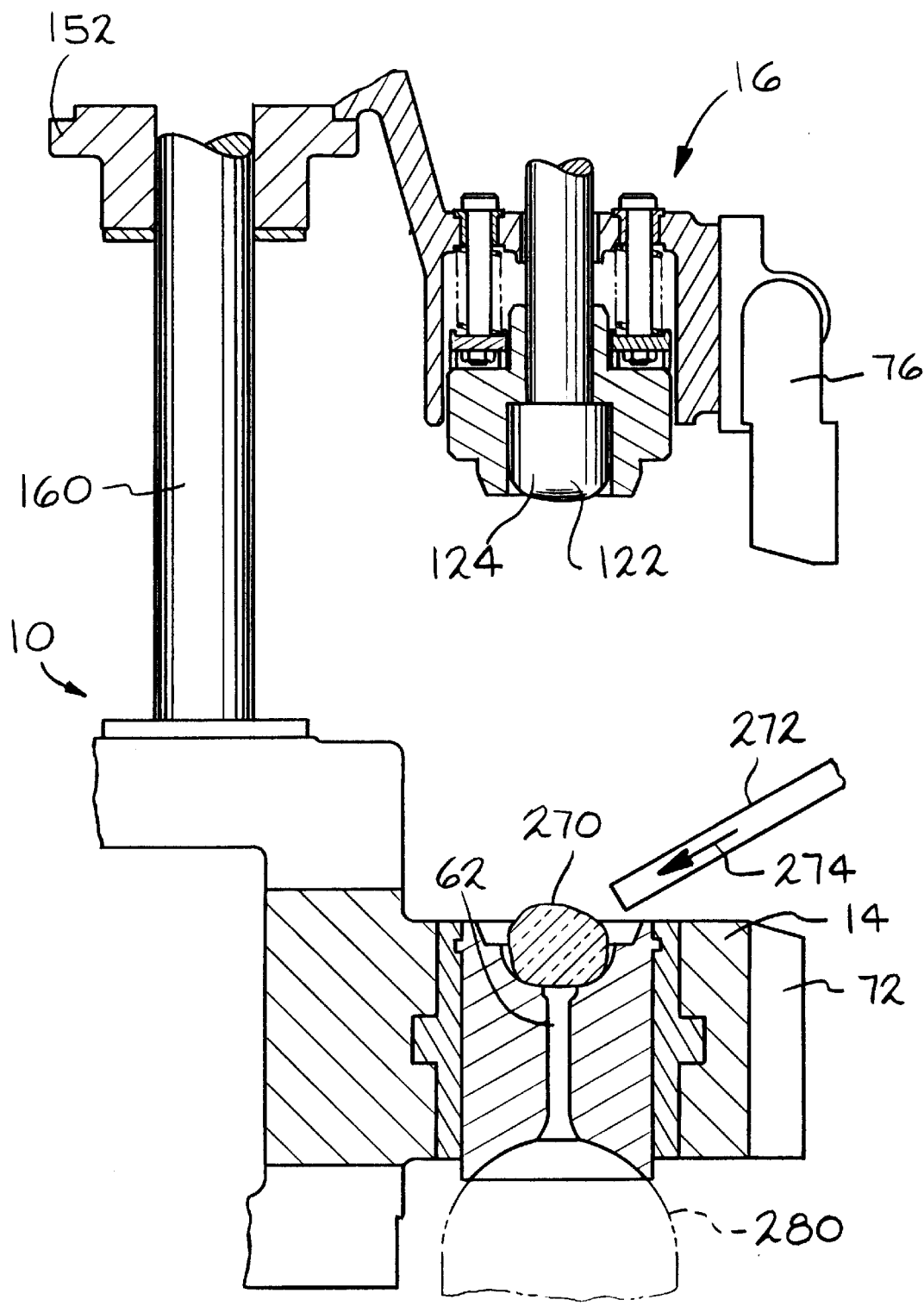
FIG. 17 is a schematic view showing a glass gob being positioned adjacent a cavity of a mold with a plunger being positioned above the mold.
Figure 18:
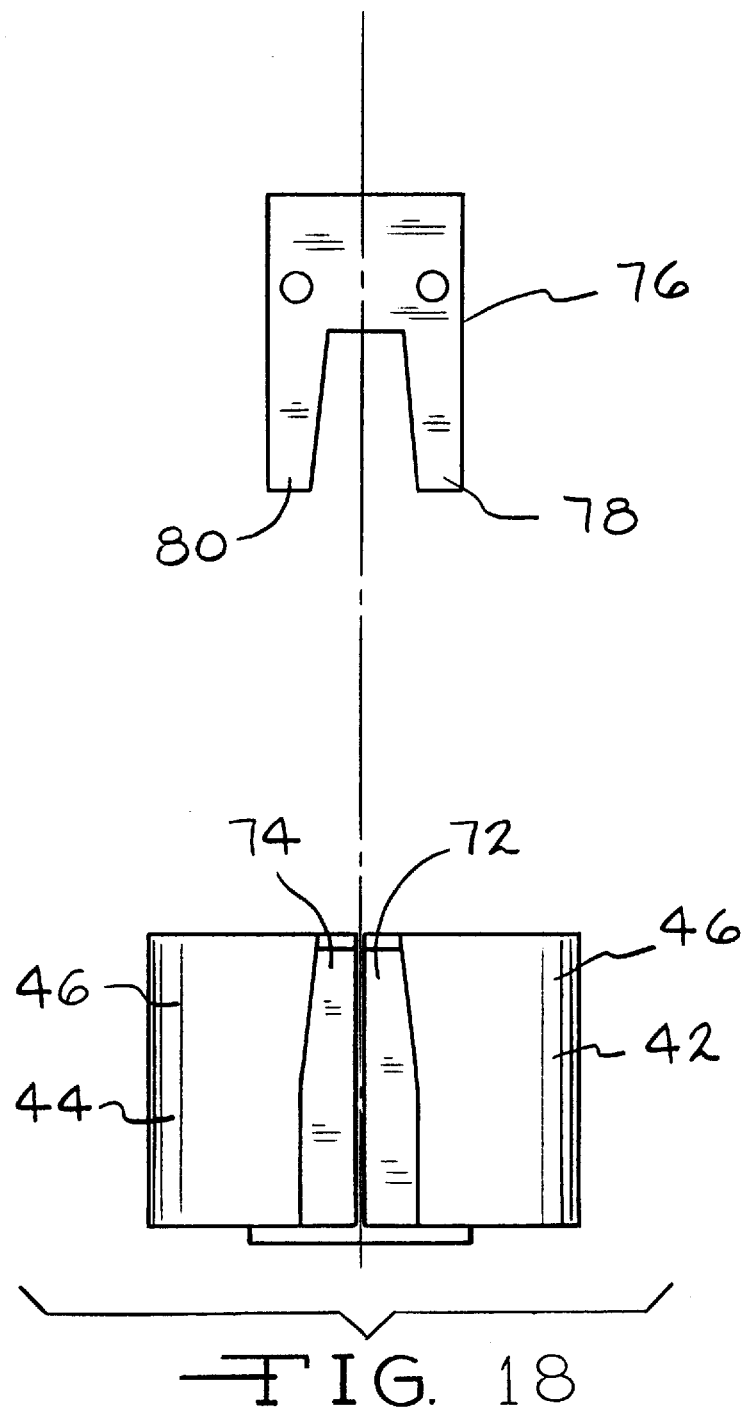
FIG. 18 is a schematic view showing the positioning of the mold halves in relation to the mold grip assembly of the plunger assembly when the apparatus is in the position shown in FIG. 17.
Figure 31:
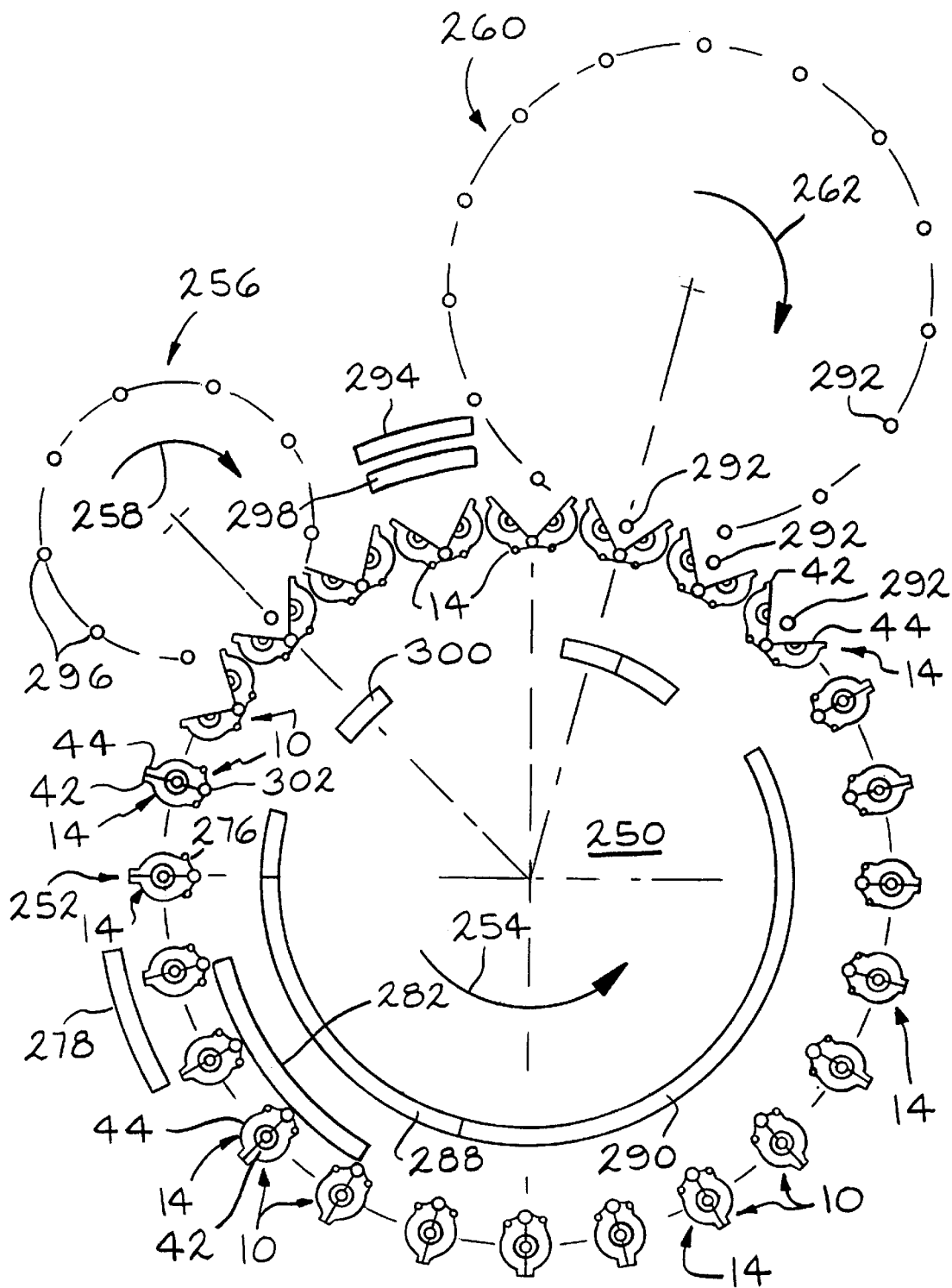
FIG. 31 is a schematic view of a machine for pressing a plurality of glass articles at a high cavity rate according to the present invention in which the individual apparatus of the invention are mounted on a rotating carriage.

The operation and method of the present invention will now be described. Referring to FIGS. 17–24 and 31, the carriage 250 is rotated in the direction indicated by the arrow 254 at a predetermined speed. Referring to FIGS. 17, 18 and 31, a glass gob 270 is deposited in the cavity 62 of a closed mold 14 by a chute 272 in the direction indicated by the arrow 274. As shown in FIG. 31, the glass gob 270 is deposited in the cavity at the position 276. The mold 14 then moves to the position 278 where a glass item, such as a bowl 280 is elevated by the ware elevator 18 adjacent the mold 14. Referring to FIG. 18, the relationship between the mold grip assembly 76 and the first and second mold holders 72 and 74 is shown when the apparatus 10 is in the position shown in FIG. 17.

Figures 19, 20:
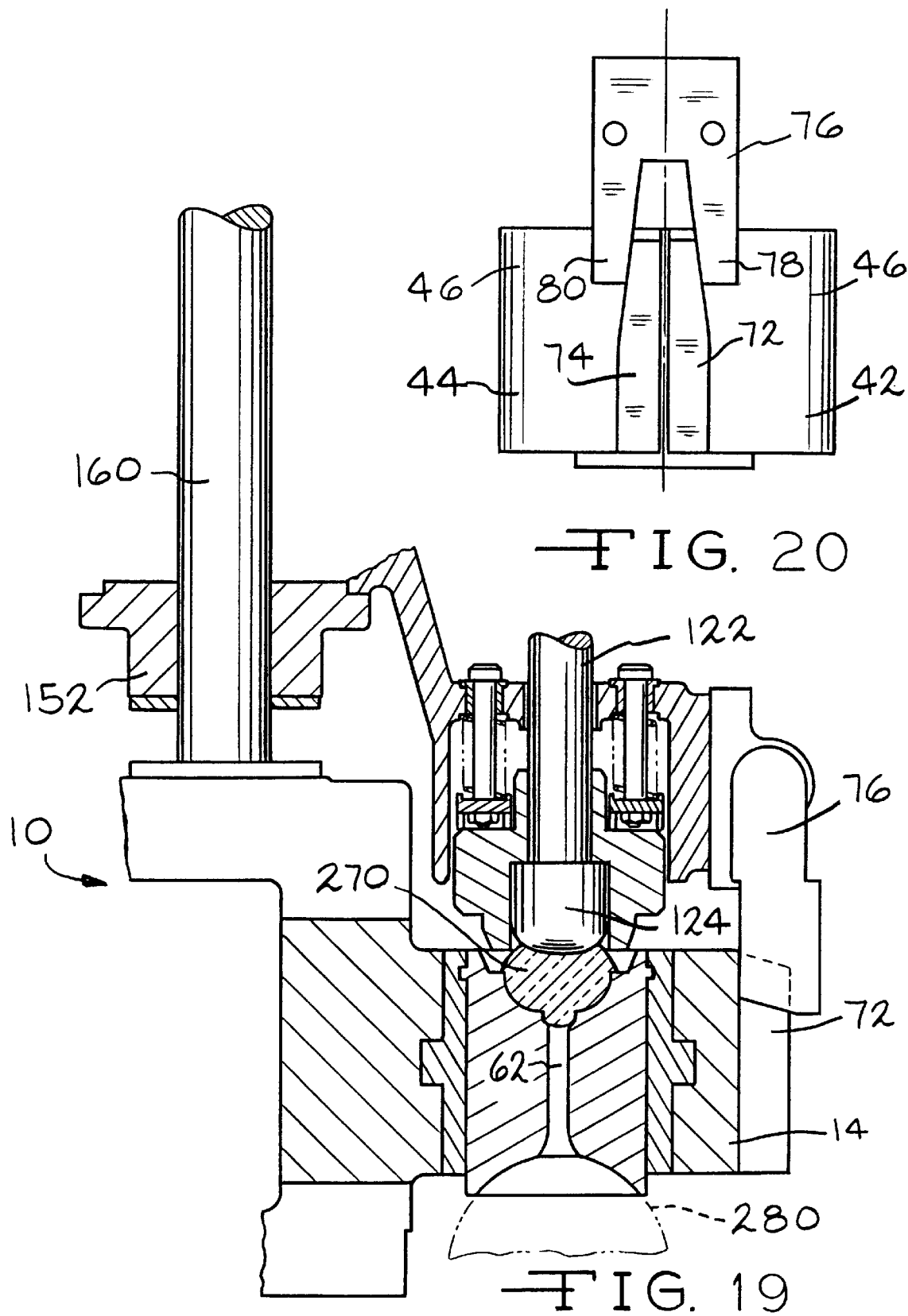
FIG. 19 is a schematic view similar to the view of FIG. 17 in which the plunger has engaged the glass gob to press the glass gob into the cavity.
FIG. 20 is a schematic view similar to the view of FIG. 18 showing the relationship of the mold halves and the mold grip assembly when the apparatus is in the position shown in FIG. 19.
Figure 24:
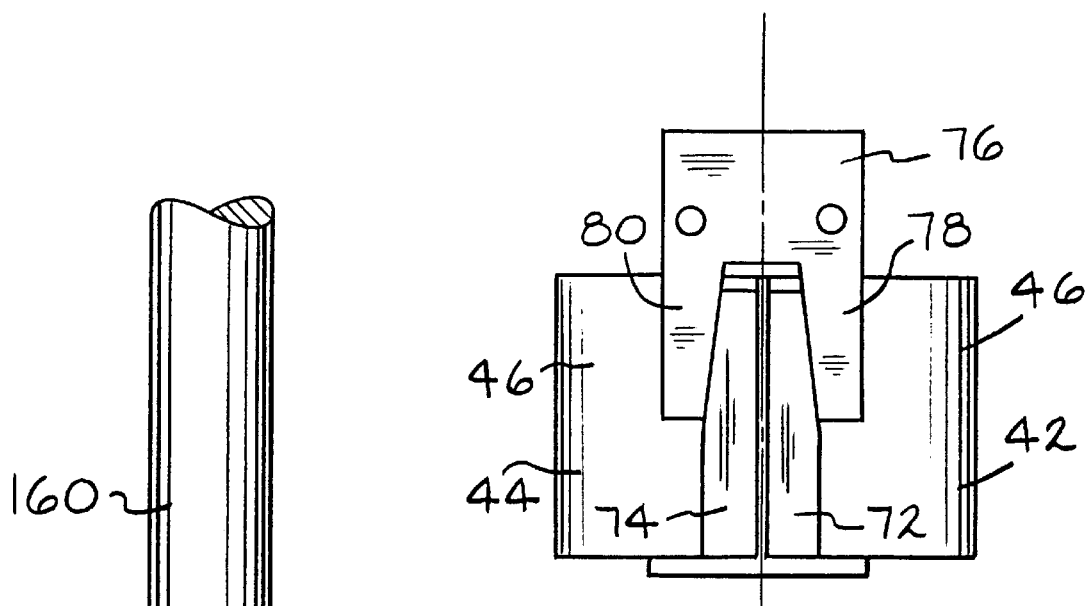
FIG. 24 is a schematic view similar to the view of FIG. 18 showing the relationship between the mold halves and the mold grip assembly when the apparatus is in the position shown in FIG. 23.
Figure 23:
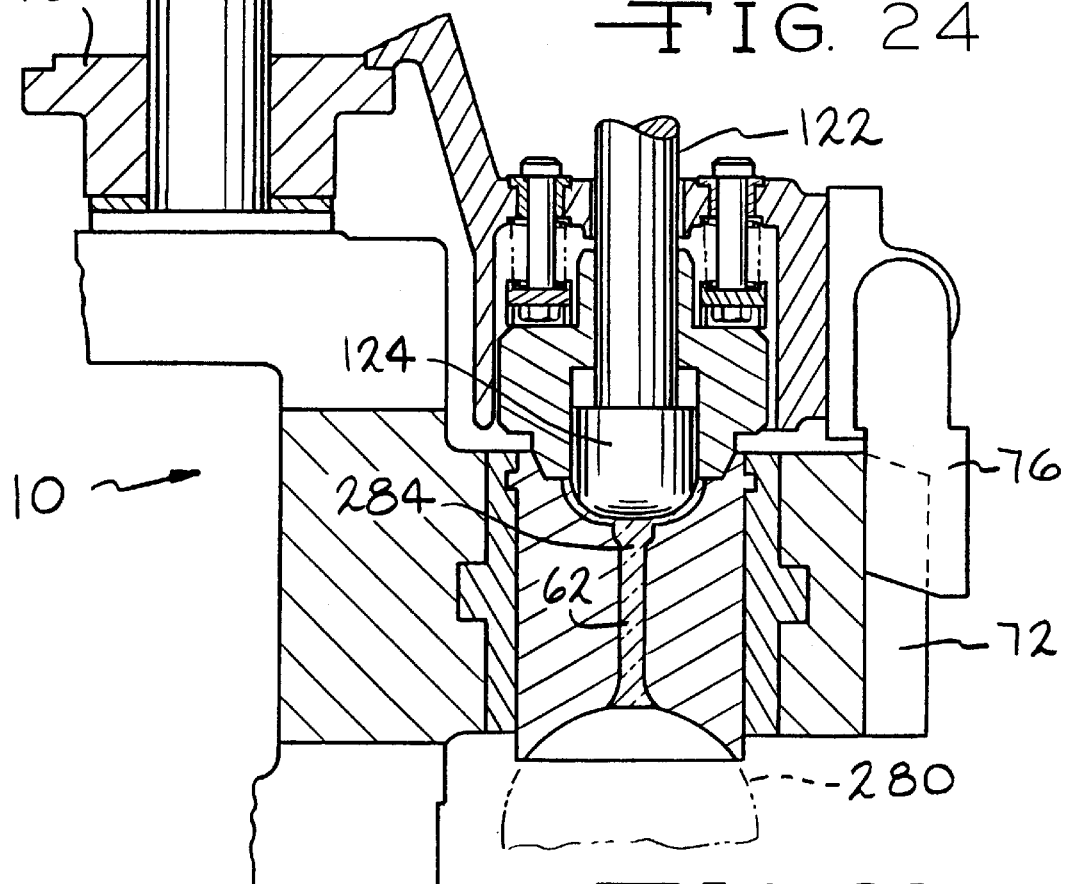
FIG. 23 is a schematic view similar to the view of FIG. 17 showing the plunger at its maximum stroke in the cavity of the mold.

Referring to FIGS. 19, 20 and 31, the press cylinder head assembly 150 of the plunger assembly 16 is actuated to move the plunger 122 adjacent the cavity 62 of the mold 14. The head 124 of the plunger 122 engages the glass gob 270 at position 282 as shown in FIG. 31. Referring to FIGS. 21–24, the plunger 122 presses the glass gob 270 into the cavity 62 to form a glass article such as a stem and base 284. At the end of the pressing cycle, the plunger 122 is withdrawn. As shown in FIG. 23, the stem and base 284 are joined to the bowl 280 to form a piece of stemware. The relationship of the mold grip assembly 76 to the first and second mold holders 72 and 74 is shown in FIGS. 20, 22 and 24 for the positions of the apparatus 10 as shown in FIGS. 19, 21 and 23, respectively.

Figure 26:
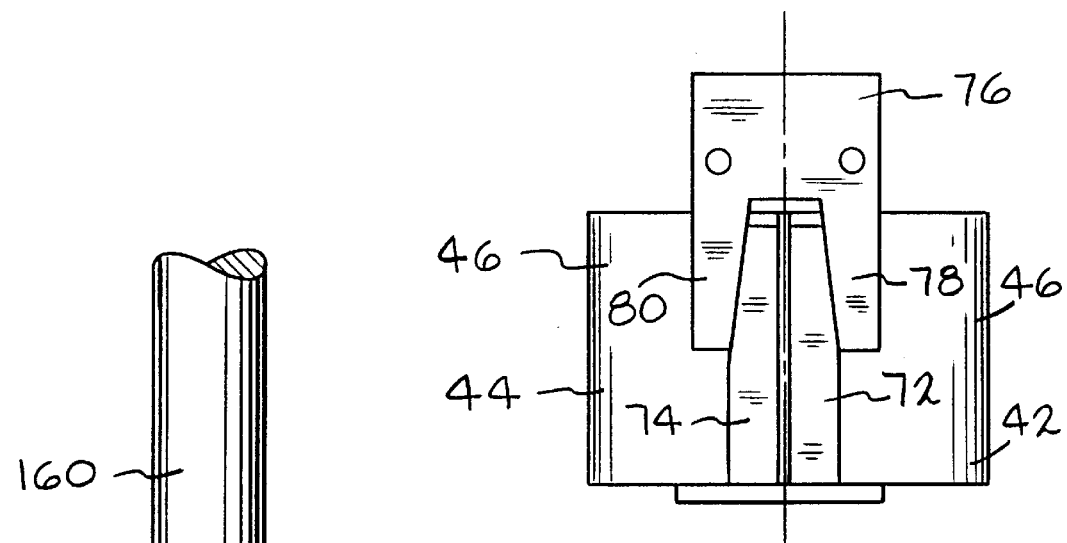
FIG. 26 is a schematic view showing the relationship between the mold halves and the mold grip assembly when the apparatus is in the position shown in FIG. 25.
Figure 25:
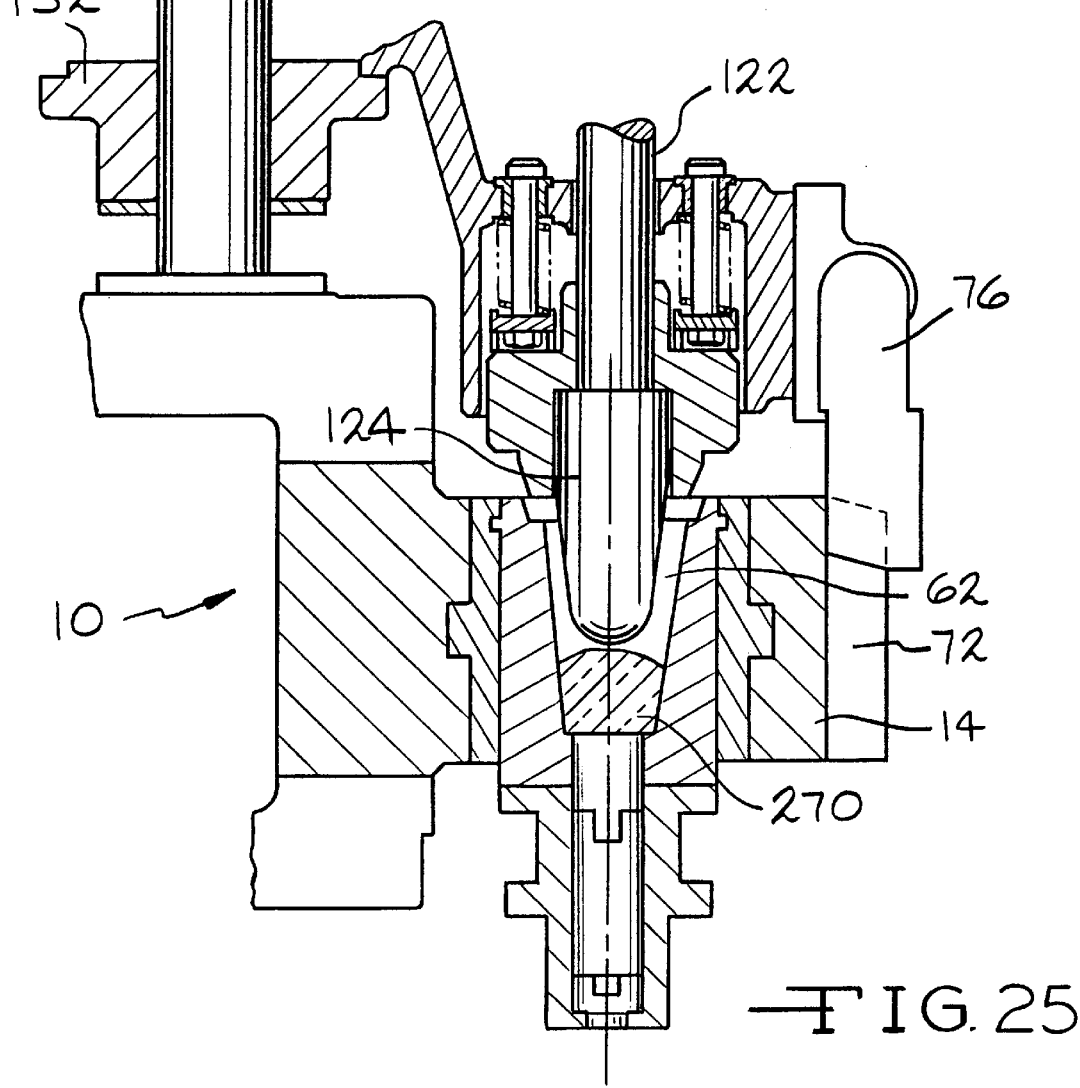
FIG. 25 is a schematic view of the apparatus according to the present invention showing a mold cavity in the form of a drinking glass in which the plunger has traveled into the cavity.
Figure 28:
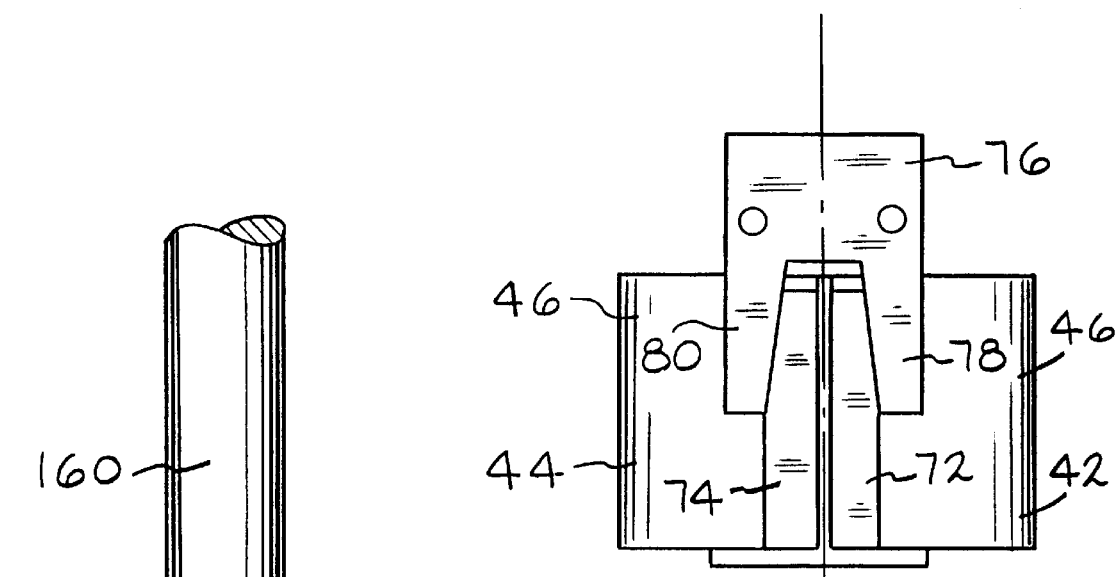
FIG. 28 is a schematic view similar to the view of FIG. 26 showing the relationship between the mold halves and the mold grip assembly when the apparatus is in the position shown in FIG. 27.
Figure 27:
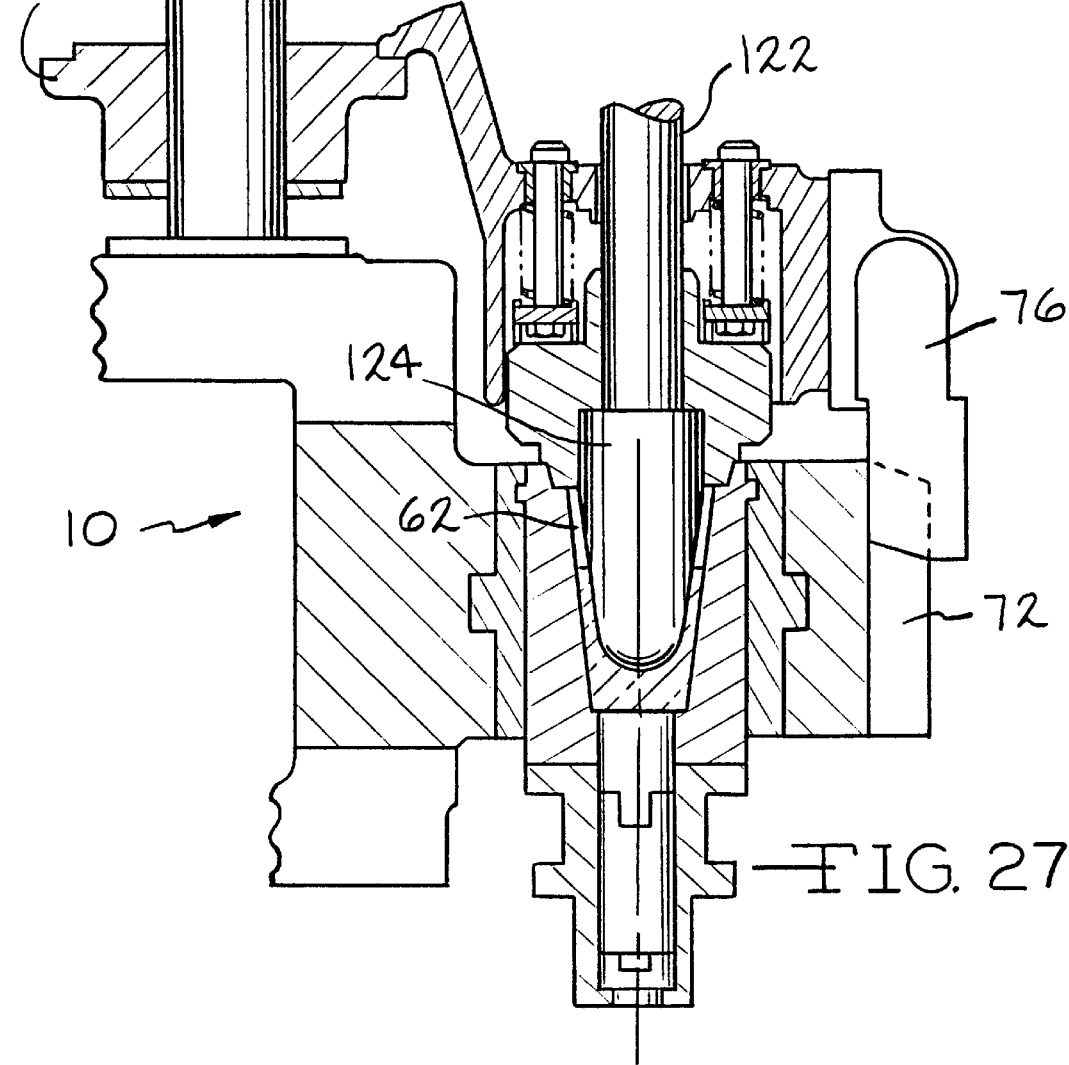
FIG. 27 is a schematic view similar to the view of FIG. 25 showing the plunger engaging the glass gob.

Referring to FIGS. 25–30, an alternative embodiment of a cavity 62 is shown. As shown in FIG. 29, the cavity 62 is in the form of a drinking glass 286. In this embodiment, the use of the ware elevator assembly 18 is not required because no glass item is joined to the drinking glass 286. The relationship of the mold grip assembly 76 to the first and second mold holders 72 and 74 for the various positions of the apparatus 10 as shown in FIGS. 25, 27 and 29 are shown in FIGS. 26, 28 and 30, respectively.

Referring to FIG. 31, the first and second mold halves 42 and 44 of the molds 14 are kept in the closed position by actuation of the mold operating cylinder assemblies 82 at the position 288. At the position 290, the mold cracking cylinders 86 are actuated to cause the first and second mold halves 42 and 44 to become cracked. The cracking of the mold halves allows for the cooling of the molds 14. The first and second mold halves 42 and 44 are cracked a predetermined distance apart from one another depending on the glass article being pressed.

Still referring to FIG. 31, at the end of position 290, the mold operating cylinder 84 of the mold operation cylinder assembly 82 is actuated to open the mold 14 to allow for the removal of the pressed glass article 292 from the mold. The glass article 292 is transferred to the glassware article unloader machine 260. The molds 14 are then lubricated at position 294. The ware elevator assembly 18 is raised to receive a bowl 296 from the bowl loader machine 256 at position 298. The ware platform 206 of the ware elevator 18 receives the bowl 296 at position 300. The mold operating cylinder 84 of the mold operating cylinder assembly 82 is then actuated to close the mold 14 at position 302. The operation of the apparatus 10 and the machine 252 is then repeated.

The method of the present invention for using apparatus 10 for pressing a plurality of glass articles at a high cavity rate can be summarized in the steps as follows:

(a) rotating a carriage to which at least two apparatus for pressing glass articles are attached, each of the apparatus includes a frame, a mold having first and second mold halves mounted on the frame, the mold halves defining a cavity for receiving a glass gob, the mold halves being movable between open and closed positions, a device for opening and closing the mold halves, a plunger movably mounted on the frame adjacent the cavity, and a device for moving the plunger;

(b) actuating the device for opening and closing the mold to close the mold;

(c) placing the glass gob adjacent the cavity;

(d) actuating the device for moving the plunger to move the plunger to press the glass gob into the cavity to form the glass article;

(e) withdrawing the plunger;

(f) actuating the device for opening and closing the mold to open the mold a predetermined distance to cool the mold; and (g) actuating the device for opening and closing the mold to open the mold to remove the glass article from the cavity.

It has been found that the present invention is highly efficient as compared to prior art apparatus. Depending on the glass article being pressed by the apparatus, the machine 252 can produce between 40 and 80 articles per minute.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense.

We claim:

1. A machine for pressing a plurality of glass articles at a high cavity rate, comprising:

a plurality of individually controllable apparatus for pressing a glass article mounted on a rotatable carriage for moving said apparatus, each of said apparatus including:

fluid control means for individually controlling actuation of each said apparatus;

a frame;

a mold having first and second mold halves mounted on said frame, said mold halves defining a cavity for receiving a glass gob, said mold halves being movable between open and closed positions;

at least one fluid actuatable mold operating cylinder being in operative communication with said fluid control means, said mold operating cylinder being operatively connected to said mold halves for opening and closing said mold halves;

at least one fluid actuatable mold cracking cylinder being in operative communication with said fluid control means, said mold cracking cylinder being operatively connected to said mold halves for cracking said mold halves to cool said mold halves;

a plunger movably mounted on said frame in alignment with said cavity, said plunger contacting and pressing said glass gob into said cavity to form said glass article; and at least one fluid actuatable plunger cylinder being in operative communication with said fluid control means, said mold cylinder being operatively connected to said plunger for moving said plunger.

2. The machine of claim 1, wherein each of said mold halves includes an exterior wall, an interior wall defining a plurality of air passageways and a cavity wall, said exterior wall being spaced from said interior wall, said interior wall being spaced from said cavity wall.

3. The machine of claim 2, wherein an interior surface of said cavity wall defines said cavity.

4. The machine of claim 2, wherein said exterior walls of said mold halves include outwardly projecting mold holders adapted to be received by a mold grip assembly mounted adjacent said plunger.

5. The machine of claim 2, wherein said apparatus further includes means for cooling said mold halves consisting of a supply of air in communication with said spaces defined by said exterior, interior and cavity walls.

6. The machine of claim 1, wherein said plunger includes means for adjusting movement of said plunger with respect to said cavity.

7. The machine of claim 1, wherein said apparatus further includes a ware elevator movably mounted on said frame adjacent said mold, said ware elevator positioning a glass item adjacent said cavity.

8. The machine of claim 1, wherein said machine includes twenty-four apparatus.

9. A method for using a machine for pressing a plurality of glass articles at a high cavity rate, including the steps of:

(a) rotating a carriage to which a plurality of individually controllable apparatus for pressing glass articles is attached, each of said apparatus including fluid control means for individually controlling actuation of each said apparatus, a frame, a mold having first and second mold halves mounted on said frame, said mold halves defining a cavity for receiving a glass gob, said mold halves being movable between open and closed positions, at least one fluid actuatable mold operating cylinder being in operative communication with said fluid control means, said mold operating cylinder being operatively connected to said mold halves for opening and closing said mold halves, at least one fluid actuable mold cracking cylinder being in operative communication with said fluid control means, said mold cracking cylinder being operatively connected to said mold halves for cracking said mold halves, a plunger movably mounted on said frame in alignment with said cavity, and at least one fluid actuatable plunger cylinder being in operative communication with said fluid control means, said mold cylinder being operatively connected to said plunger for moving said plunger;

(b) actuating said mold operating cylinder by said fluid control means to close said mold;

(c) placing said glass gob adjacent said cavity;

(d) actuating said plunger cylinder by said fluid control means to move said plunger to contact and press said glass gob into said cavity to form said glass article;

(e) actuating said plunger cylinder by said fluid control means to withdraw said plunger from said cavity;

(f) actuating said mold cracking cylinder by said fluid control means to crack said mold halves to cool said mold; and (g) actuating said mold operating cylinder by said fluid control means to open said mold halves to remove said glass article from said cavity.

10. The method of claim 9, wherein each of said mold halves includes an exterior wall, an interior wall defining a plurality of air passageways and a cavity wall, said exterior wall being spaced from said interior wall, said interior wall being spaced from said cavity wall.

11. The method of claim 10, wherein an interior surface of said cavity wall defines said cavity.

12. The method of claim 10, wherein said exterior walls include outwardly projecting mold holders adapted to be received by a mold grip assembly mounted adjacent said plunger.

13. The method of claim 10, wherein said apparatus further includes means for cooling said mold halves consisting of a supply of air in communication with said spaces defined by said exterior, interior and cavity walls.

14. The method of claim 9, wherein said plunger includes means for adjusting movement of said plunger with respect to said cavity.

15. The method of claim 9, wherein said apparatus further includes a ware elevator movably mounted on said frame adjacent said mold, said method including the additional step of: (h) actuating said ware elevator to move said ware elevator adjacent said mold to position a glass item adjacent said cavity, said step (h) occurring prior to said step (e).

16. The method of claim 15, wherein said method includes the additional step of: (i) actuating said ware elevator to move said ware elevator away from said mold, said step (i) occurring after said step (e).

* * * * *